US006429282B1

(12) United States Patent
Wang et al.

(10) Patent No.: US 6,429,282 B1
(45) Date of Patent: Aug. 6, 2002

(54) STABLE, CONCENTRATED SOLUTIONS OF POLYANILINE USING AMINES AS GEL INHIBITORS

(75) Inventors: Hsing-Lin Wang, Los Alamos; Benjamin R. Mattes, Tesuque, both of NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/668,556

(22) Filed: Sep. 22, 2000

Related U.S. Application Data

(63) Continuation-in-part of application No. 09/334,719, filed on Jun. 16, 1999, now Pat. No. 6,123,883, which is a division of application No. 08/926,338, filed on Sep. 5, 1997, now Pat. No. 5,981,695, which is a continuation of application No. 08/658,928, filed on May 31, 1996, now abandoned.

(51) Int. Cl.$^7$ .............................. C08J 3/00; C08G 73/00
(52) U.S. Cl. ..................... 528/422; 528/492; 252/500; 524/236
(58) Field of Search ................................ 528/492, 422; 252/500; 524/236

(56) References Cited

U.S. PATENT DOCUMENTS

| 5,135,682 A | | 8/1992 | Cohen et al. ................ 252/500 |
| 5,147,913 A | | 9/1992 | Mac Diarmid et al. ..... 524/104 |
| 5,278,213 A | * | 1/1994 | Han et al. |
| 5,312,686 A | | 5/1994 | Mac Diarmid et al. ..... 428/364 |
| 5,324,453 A | | 6/1994 | Cao et al. .................... 252/500 |
| 5,583,169 A | | 12/1996 | Wrobleski et al. ............ 524/99 |
| 5,981,695 A | * | 11/1999 | Mattes et al. |

OTHER PUBLICATIONS

Chien–Chung Han and Rong–Chyuan Jeng, "Concurrent Reduction And Modification Of Polyaniline Emeraldine Base With Pyrrolidine And Other Nucleophiles," Chem. Commun. 1997, pp. 553–554.
A. G. MacDiarmid et al., "Conducting Polymers", Alcacer, L., ed., Riedel Pub., 1986, p. 105, Fig. 1c.
E. J. Oh et al., "Polyaniline: Dependency Of Selected Properties On Molecular Weight," Synthetic Metals, 55–57, 977 (1993).
S. A. Chen et al., "Conductivity Relaxation Of 1–Methyl–2–Pyrrolidinone–Plasticized Polyaniline Film", Macromolecules 28, 7645 (1995).
A.G. MacDiarmid et al., "Towards Optimization of Electrical and Mechanical Properties of Polyaniline: Is Cross–Linking Between Chains the Key?", Synthetic Metals, 55–57, (1993) 753.
K. T. Tzou, R. V. Gregory, "Improved Solution Stability And Spinnability Of Concentrated Polyaniline Solution Using N,N–DimethylPropylene Urea As The Spin Bath Solvent," Synthetic Metals 69, 109–112, 1995.
C. H. Hsu, J.D. Cohen and R.F. Tietz "Polyaniline Spinning Solutions and Fibers," Synthetic Metals 59, 37 (1993).
Debra A. Wrobleski and Brian C. Benicewicz, "Stabilization of Polyaniline Solutions" Polymer Preprints 35, 267 (1994).
M. Angelopoulos, et al, "LiCl Induced Morphological Changes in Polyaniline Base and Their Effect on the Electronic Properties of the Doped Form", Macromolecules, 29, 8, 3046.
A. G. MacDiarmid et al., "Polyanaline: Synthesis and Characterization of the Emaraldine Oxidation State by Elemental Analysis", *Conducting Polymers*, L. Alcacer ed., Riedel Publishers, 1986, pp. 105–120.
L. J. Vander Pauw, "A Method of Measuring the Resistivity and Hall Coefficient on Lamellae of Arbitrary Shape," Phillips Technical Review 20, 220 (1958).

* cited by examiner

*Primary Examiner*—Tae H. Yoon
(74) *Attorney, Agent, or Firm*—Samuel M. Freund

(57) ABSTRACT

Stable, concentrated solutions of high-molecular weight polyaniline using amines as gel inhibitors. Certain amine compounds (gel inhibitors) are used to form highly concentrated, stable solutions of the emeraldine base form of polyaniline in numerous organic solvents from which coatings, films and fibers are readily prepared without problems associated with rapid gelation which occurs when concentrated solutions are attempted without the use of the gel inhibitors of the present invention. Tertiary amines are used to solubilize low-molecular weight fractions ($M_w < 120,000$, $M_n < 30,000$) of the pernigraniline, emeraldine, and leucoemeraldine oxidation states of polyaniline as concentrated (>20 wt. %) polyaniline solutions, while primary and secondary amines are used to produce solutions having 15–40 wt % of high-molecular weight polyaniline [$M_w \geq 120,000$, $M_n \geq 30,000$]. Concentrated solutions of polyaniline co-polymers or ring and/or nitrogen-substituted polyanilines may also be prepared.

24 Claims, 12 Drawing Sheets

STABLE, CONCENTRATED SOLUTIONS OF POLYANILINE USING AMINES AS GEL INHIBITORS

The present patent application is a continuation-in-part of copending application Ser. No. 09/334,719, filed on Jun. 16, 1999, now U.S. Pat. No. 6,123,883 which is a Divisional of Ser. No. 08/926,338, filed on Sep. 5, 1997, now U.S. Pat. No. 5,981,685 which is a file wrapper continuation patent application of Ser. No. 08/658,928, filed on May 31, 1996 now abandoned.

This invention was made with government support under Contract No. W-7405-ENG-36 awarded by the U.S. Department of Energy. The government has certain rights in the invention.

FIELD OF THE INVENTION

The present invention relates generally to the preparation of solutions of polyaniline and, more particularly, to the preparation of concentrated solutions (15%–40% w/w) having molecular weight averages $(M_w) \geq 120,000$ and number averages $(M_n) \geq 30,000$ in the pernigraniline, emeraldine, and leucoemeraldine base forms of polyaniline using certain primary and secondary amines as gel inhibitors, and the preparation of solutions (>20% w/w) having molecular weight averages $(M_w) < 120,000$ and number averages $(M_n) < 30,000$ in these forms of polyaniline using certain primary, secondary and tertiary amines as gel inhibitors, in polar aprotic organic solvents, which solutions may be processed into films, coatings, and fibers that are highly electrically conducting after subsequent exposure to acid.

BACKGROUND OF THE INVENTION

Dopable π-conjugated polymers (CPs) possess alternating double and single bonds along the polymer main chain repeat units, such as those found in the family of polymers known as polyaniline, show potential for a variety of commercial applications such as chemical separations, electromagnetic interference shielding, protection of metals from corrosive environments, antistatic coatings, and current carrying fibers. Polyaniline is a commercially attractive polymer since, unlike many other dopable π-conjugated polymers, it is both environmentally stable and can be made electrically conducting by acid treatment.

Electrical conductivity (σ) of CPs is possible due to electron mobility along (intrachain) and between (interchain) polymer chains in a solid state article. The magnitude of the conductivity depends upon the number of charge carriers (n) which is determined by the extent of doping with oxidizing or reducing chemical agents (or in the special case of polyaniline, with an acid), the charge on these carriers (q), and on the combined interchain and intrachain mobilities ($\mu$). These relationships are related by: $\sigma = nq\mu$. In order to obtain high conductivities, n is usually maximized by a chemical doping process (generation of electrons or holes on the polymer chain), so that conductivity becomes dependent on the mobility of the carriers. At the maximum doping levels, it is the mobility of the charge carriers which must be increased to obtain higher conductivity. Mobility of charge carriers in some cases depend upon the polymer's morphology once it is "frozen" into a non equilibrium glassy solid state article determined by processing conditions. Interchain mobility depends upon the statistical distribution of conformational features such as bond and torsion angles, interchain distances, packing density, orientation, fractional crystallinity, free volume, etc. By contrast, intrachain mobility depends upon the degree and extent of π-conjugation and defects along the polymer chains, and the polymer chain conformations. It is therefore desirable to develop improved processing procedures which allow control over the factors governing mobility in order to generate higher conductivities in polyaniline.

Optimally doped CPs contain approximately equal numbers of carriers, but exhibit order of magnitude differences in conductivity depending on sample preparation methods. For instance, stretch-aligned optimally doped transpolyacetylene films exhibit conductivities of the order of $10^5$ S/cm, while identically doped nonstretched films are in the range of $10^3$ S/cm. Structural features which favor enhanced carrier mobility, e.g., chain alignment through mechanical stretching, are important for obtaining high transport coefficients and 3-dimensional metallic transport. Interchain mobility depends upon the statistical distribution of conformational features such as bond and torsion angles, interchain distances, packing density, orientation, fractional crystallinity, free volume, and the spatial distribution and ordering of dopants. By contrast, intrachain mobility depends upon the degree and extent of π-conjugation, molecular weight, number of defects along the polymer chains, and the polymer chain conformations themselves. Processing procedures which exert control over the structural factors which govern mobility must be utilized in order to achieve metallic-like conductivities in solid-state π-conjugated polymers.

However, despite efforts to develop viable, processing routes for polyaniline (PANI), the proccessing barriers intrinsic to this material have not yet been overcome: (a) production of practical, high-quality fibers with adequate strength; and, simultaneously (b) achievement of metallic state conductivity predicted by theory. Melt extrusion is not feasible since this polymer, like most conducting polymers (CPs), decomposes before melting. Solution processing of PANI into film, fiber, or coatings is extraordinarily difficult due to: (a) extremely poor solubility in solvents; (b) rapid polymer gelation times at low (>5% w/w) total solids content; and, (c) strong aggregation tendency due to interchain attractive forces, e.g., hydrogen bonding. Furthermore, these problems prevent utilization of high molecular weight polyaniline at concentrations exceeding 15% w/w which are generally required to produce strong fibers by dry-jet wet spinning techniques or impact resistant coatings, or films by conventional rolling techniques.

There are three oxidation states for polyaniline (PANI): a) the fully oxidized form known as pernigraniline base; b) the intermediate form called emeraldine base; and c) the fully reduced form which is given the name leucoemeraldine base. The general formula describing each of these three primary oxidation states for PANI is: $[(C_6H_4-NH-C_6H_4-NH-)_{1-x}][(C_6H_4-N=C_6H_4=N-)_x]$, where x ranges from 0 to 1. When x=1, the polymer is in the fully oxidized (pernigraniline) form and each nitrogen of the polymer repeat unit is a tertiary amine, i.e., all are imine nitrogens. When x=0, the polymer is in the fully reduced (leucoemeraldine) oxidation state and every nitrogen of the polymer repeat unit is a secondary amine. However, when x=0.5, the polymer is in an intermediate (emeraldine) oxidation state with equal numbers of amine and imine nitrogens in the polymer repeat unit. These structures were deduced by Green and Woodhead early in this century.

Emeraldine base is the well-known form of PANI and this "A-B" base polymer exhibits the structure:

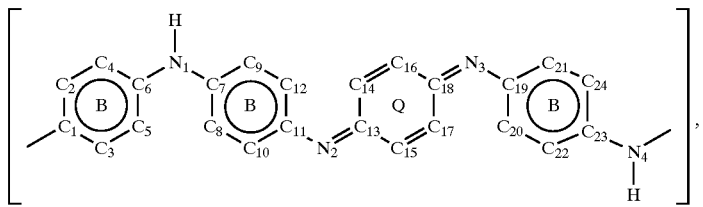

where the repeat unit is fully planar and has one quinoid (Q) and three benzenoid (B) ring monomers (tetrameric repeating units each containing two secondary amine and two tertiary imine nitrogen atoms).

The untreated EB is itself an electrical insulator. When powders of EB are treated with acid solutions, the imine nitrogen atoms extract protons from solution with the acid counterion associating with the polymer chain to maintain overall charge neutrality. When less than 50% of the available imine nitrogens are coordinated to form quaternary iminium salt complexes; that is, immersion in solutions having pH values between 2 and 7, the polymer becomes a semiconductor and is called a bipolaron (see FIG. 1b hereof), since charge carriers delocalized along the π-conjugated polymer backbone are spinless. Immersion in more concentrated acid solutions (pH<2) generates polarons (see FIG. 1c hereof) since, due to self-localized reorganization of electronic states, the mobile charge carriers are now sufficiently delocalized to produce mobile spins. Thus, treatment of EB (which has a conductivity of less than $10^{-10}$ Siemen/cm [S/cm]) with an excess of concentrated acid solution (pH<1) results in an electrically conductive polymer having a conductivity of about 1 S/cm. Under these latter doping conditions, the maximum number of charge carriers (n) have been generated on the polymer since all of the nitrogen atoms, available as protonation sites, are occupied. Thus, the conductivity of EB can be increased by over ten orders of magnitude ($<10^{-10}$ to 1 S/cm) by varying the number of protonated imine sites (carriers) through exposure to an equilibrium pH concentration of acid ($H^+A^-$), forming thereby a quartenary emeraldine iminium salt (ES). The average dopant concentration is given by the molar ratio of anions ($A^-$) to nitrogen atoms (N) as y=$A^-$/N, where y has values up to 0.5 (100% doping). Although this acid doping process involves no net charge transfer, it profoundly alters the local bond order of the primary chain and, simultaneously, the ring torsion of the labile phenylene units. In general, doping is occurs when a conducting polymer is exposed to a controlled amount of an oxidizing (p-type) or reducing (n-type) agent. In the special case of EB, a Lewis or a Brönsted acid is used to induce charge carriers onto the polymer in order to improve conductivity.

In "Concurrent Reduction And Modification Of Polyaniline Emeraldine Base With Pyrrolidine And Other Nucleophiles," by Chien-Chung Han and Rong-Chyuan Jeng, Chem. Commun. 1997, pages 553–554, it is shown that polyaniline emeraldine base can easily be modified by pyrrolidine and other nucleophiles such as piperidine, morpholine, alkane-1-thiols, and mercaptoacetic acid through concurrent reduction and substitution mechanisms. Such modifications may significantly reduce the conductivity of the resulting polymers.

Lewis acid (A)-base (B) interactions lead to the formation of acid-base complexes (A:B). A Lewis acid is an electron pair acceptor (EPA), while a Lewis base is an electron pair donor (EPD). An A:B complex is formed when there is orbital overlap between a filled electron orbital of high energy from the Lewis base and an empty low energy orbital from the Lewis Acid. Hydrogen bonding is a Lewis acid-base type interaction in which the EPA is also a Brönsted acid; that is, a proton attached to a heteroatom. The hydrogen bond is a secondary bond formed to another atom by a covalently bonded hydrogen atom. Schematically, this interaction is described by:

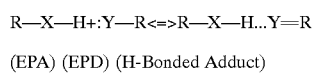

(EPA) (EPD) (H-Bonded Adduct)

where X and Y atoms both have electronegativities greater than hydrogen; for example, C, N, P, O, S, and halogens. Imine nitrogens (tertiary amines) are good proton acceptors, while primary and secondary amines can be either proton donors or acceptors.

The commonly reported polyaniline synthesis describes the heterogeneous radical chain polymerization of aniline at 0° C. in 1 N aqueous HCl, and leads to the acid salt form of polyaniline (See, e.g., A. G. MacDiarmid et.al., "Conducting Polymers", Alcacer, L., ed., Riedel Pub., 1986, p.105, FIG. 1c). When this polyaniline salt powder is immersed in an excess of a strong aqueous base, it is deprotonated to yield EB (See FIG. 1a hereof. Most polyaniline investigations have employed materials having molecular weights with weight average ($M_w$)<120,000 and number average ($M_n$) <30,000 which are produced by these synthetic conditions (See, e.g., E. J. Oh et al., "Polyaniline: Dependency Of Selected Properties On Molecular Weight," Synthetic Metals, 55–57, 977 (1993).

In U.S. Pat. No. 5,312,686 for "Processable, High Molecular Weight Polyaniline And Fibers Made Therefrom," which issued to Alan G. MacDiarmid et al. on May 17, 1994, a procedure for preparing high molecular weight polyaniline is reported. The method involves reducing the standard reaction temperature to −30° C., by adding 5 M LiCl to the reaction mixture, thereby producing high-molecular-weight EB. The molecular weight of the resulting polymer may be varied from ($M_w$)=250,000 to greater than ($M_w$)=400,000 by controlling the rate at which the initiator is added to the cold reaction mixture, and the reaction temperature. These high molecular-weight polyanilines exhibit poor solubility and have short gelation times. A complex cycling procedure of acid doping, followed by undoping with aqueous base reportedly led to improved solubility and concentrated solutions in N-methyl-2-pyrrolidinone (NMP). Unfortunately these solutions were discovered to rapidly gel when prepared in the 1–3% w/w range in NMP. Thus, there exists a need for developing procedures to process high molecular weight polyaniline.

The utility of polyaniline EB with ($M_w$)≧120,000 and ($M_n$)≧30,000 has been limited. However, in order to process high-quality fibers possessing good mechanical properties, it is known in the art that solution concentrations of a particular polymer should be in the 15–30% (w/w) range.

Moreover, it is desirable to use the highest molecular weight polymers that will dissolve in solvents in the target concentration range. Tensile strength and modulus, flex life, and impact strength all increase with increasing molecular weight. Typically, molecular weights $(M_w) \geq 120,000$ and $(M_n) > 30,000$ are preferred. Such solutions are suitable for dry-wet or wet-wet fiber spinning processes that produce high quality fibers, and also for the generation of films, coatings and other useful objects.

The emeraldine base form of polyaniline is reported to be soluble in NMP at the 1–5% weight level. Such solutions may be cast into dry dense films after the wet film is thermally treated to remove the solvent. Films prepared in this manner, when immersed in a concentrated acid solution, have a conductivity of between 1 and 5 S/cm. Few other organic solvents for EB, such as N,N,N'N'-tetramethyl urea and N,N'-dimethyl propylene urea (DMPU) as examples, have been reported in the literature. All of these solvents have amide functional groups, which tend to form strong hydrogen bonds between the carbonyl group of the solvent and the secondary amine groups of the emeraldine base, thus encouraging limited solubility at dilute concentrations prepared from low molecular weight polymer. However, solubilities of even low molecular weight EB (0° C. synthesis, $(M_w) < 120,000$, $(M_n) < 30,000$) in such solvents is poor (<1–5% w/w). Solutions prepared from NMP above this concentration range exhibit rapid gelation. (see, e.g., E. J. Oh et al., supra). Oh et al. observed that the gelation time is both inversely proportional to the weight percent of EB in NMP and to it's molecular weight. S. A. Chen et al. in "Conductivity Relaxation Of 1-Methyl-2-Pyrrolidinone-Plasticized Polyaniline Film", Macromolecules 28, 7645 (1995), have reported evidence for a strong hydrogen bond interaction of the C=O group from NMP with the secondary amine (NH) functional groups of EB. Presumably, it is the imine nitrogens from the polymer which are strongly attracted to hydrogen atoms of the secondary amines on adjacent chains. This strong attractive force promotes interchain hydrogen bonding which serve as physical cross-links between chains and leads to rapid gelation in EB solutions, or in the solid state article (FIG. 2a).

Emeraldine base solutions can be processed into free-standing films. If such films are stretched over a hot pin before immersion in a concentrated acid solution, and then subsequently treated with an acid, conductivities of as great as 200 S/cm may be obtained. A. G. MacDiarmid et al "Towards Optimization of Electrical and Mechanical Properties of Polyaniline: Is Cross-Linking Between Chains the Key?", Synthetic Metals, 55–57, (1993) 753, shows that stretch alignment of emeraldine base films [prepared from dilute (1–3% w/w) EB in N-methyl-2-pyrolidinone (NMP) solutions], over a hot pin at 120° C. to a 2–5× draw ratio, increases the films fractional crystallinity (from ~5 to 50%) and additionally increases the anisotropic conductivity of the maximally acid doped film from 1 to 200 S/cm, in the direction parallel to the stretch. Hence, this example demonstrates the importance of manipulating the parameters which control carrier mobility ($\mu$) in the solid state articles to enhance physical properties such as conductivity.

Preparation of EB solutions having >10% w/w from DMPU has been reported (See e.g., K. T. Tzou, R. V. Gregory "Improved Solution Stability And Spinnability Of Concentrated Polyaniline Solution Using N,N-DimethylPropylene Urea As The Spin Bath Solvent" Synthetic Metals 69, 109–112, 1995). Here also, a synthetic procedure which yields low molecular weight EB $((M_w) < 120,000, (M_n) < 30,000)$ was reported. The solutions were stable long enough for the authors to spin a fiber which exhibited high conductivity; however, the details of processing, and the solubility limits, are lacking, and the resulting mechanical properties of the fiber would be much improved if higher molecular weights were accessible in their solvent systems.

A second category of reported solvents for polyaniline includes acids, such as m-cresol, formic acid, methanesulfonic acid, sulfuric acid, as examples. Solubility derives from the basic nature of the EB polymer which forms ionic coordination complexes between the acid and the imine nitrogens of the polymer. Solubility increases as the strength of the acid increases (>10% w/w for sulfuric acid, 1–5% w/w in m-cresol and formic acid). It is doubtful that EB is truly dissolved in such acid solutions; but rather, it is more likely that the solutions consist of a fine dispersion of polyaniline particles. Processing EB in such solutions is not desirable since 1. The solvents are hazardous; 2. Strong acids can either over-oxidize emeraldine or chemically substitute on the polymer rings; and 3. The resulting polymers tend to degrade if stored in solution for more than a few days. Additionally, even though partially soluble in acid media, EB fibers spun from acid solution have been found to be mechanically weak.

A major obstacle to the fabrication of commercially useful articles, such as high quality fibers, hollow fibers, or articles having other useful geometries, from solutions of polyaniline, therefore, is the poor solubility of the polymer in solvents suitable for processing using conventional polymer engineering methods. Such solutions exhibit a strong tendency to form gels on a relatively short time scales due to interchain hydrogen bond formation, even for dilute solutions. The instability is such that the solutions cannot be extruded through spinnerette orifices because they gel too rapidly or form particulate material which clogs the spinnerette tip, causing unsafe pressure increases in the spin line which represent a significant health risk situation to operators.

U.S. Pat. No. 5,135,682 for "Stable Solutions Of Polyaniline And Shaped Articles Therefrom, which issued to Jeffrey D. Cohen and Raymond F. Tietz on Aug. 4, 1992 discloses a procedure for preparing stable dry-wet spinning solutions of EB in the 10–30% w/w range. Stable, spinnable solutions were prepared using 1,4-diaminocyclohexane, 1,5-diazabicyclo (4.3.0) non-5-ene, or by dissolving EB in NMP with the addition of specified quantities of cosolvents consisting of either pyrrolidine (Py) [11% EB; 33% Py; and 56% NMP w/w/w] or ammonia. The amount of pyrrolidine added as cosolvent, compared to the amount of the EB added to NMP solution, can be expressed as the ratio of moles Py/moles EB tetrameric repeat unit, which in their preferred embodiment is 15.5. (The molecular weight of the EB repeat unit is 362 g/mol, and that of Py is 71.13 g/mol). Poor quality fibers were observed for the NMP/Py solutions (see e.g. ibid. Example 5). The work was further described in "Polyaniline Spinning Solutions and Fibers," by C.-H. Hsu, J. D. Cohen and R. F. Tietz in Synthetic Metals 59, 37 (1993), where the authors suggested that the physical degradation of the polyaniline fibers, especially after exposure to an acid, was likely due to the addition of Py or ammonia cosolvents, as a result of chemical interactions between the cosolvent and the polymer. Molecular weights reported from the described synthetic procedure were approximately $(M_n) = 20,000$ and $(M_w) = 120,000$. Synthetic conditions were carried out at −8° C. without LiCl added to the reaction mixture.

In U.S. Pat. No. 5,147,913 for "Cross-Linked Polymers Derived From Polyaniline And Gels Comprising The Same," which issued to Alan G. MacDiarmid and Xun Tang on Sep. 15, 1992, the preparation of cross-linked polymers of polyaniline by providing a substantially linear polymer which comprises polyaniline and/or a polyaniline derivative, mixing the linear polymer with a liquid in which the cross-linked polymer is substantially insoluble, and cross-linking the polymer through agitation, is described. Preferred liquids for preparing such gels include NMP. A preferred embodiment for forming such gels is utilization of EB in NMP at concentrations >5% w/w.

In "Stabilization of Polyaniline Solutions" by Debra A. Wrobleski and Brian C. Benicewicz, Polymer Preprints 35, 267 (1994) and in "Stabilization of Polyaniline Solutions Through Additives," U.S. Pat. No. 5,583,169 which issued to Debra A. Wrobleski et al. on Dec. 10, 1996, the authors report the addition of hindered amine antioxidants and UV absorbers to up to 5% w/w solutions of EB in NMP to increase the gelation time for such solutions. Although molecular weights for the EB are not reported, the described synthesis must have produced EB with weight average molecular weights below $(M_w)$<100,000 and number averages $(M_n)$<30,000.

Accordingly, it is an object of the present invention to provide a method for dissolving high concentrations (between 15 and 40% w/w) of polyanilines [weight averages $(M_w) \geq 120,000$ and number averages $(M_n) \geq 30,000$] without significant gel formation over a time period sufficient to process the solution obtained thereby into articles.

Another object of the invention is to provide a method for preparing solutions having high concentrations (between 15 and 40% w/w) of polyanilines [weight averages $(M_w) \geq 120,000$ and number averages $(M_n) \geq 30,000$] from which articles can be prepared having improved electrical conductivities and mechanical properties.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for preparing solutions having between 15% and 40% by weight of $(M_w) \geq 130,000$, $(M_n) \geq 30,000$ (high-molecular weight) emeraldine base form of polyaniline hereof includes the steps of: mixing a solvent for polyaniline with a primary amine, a secondary amine or a mixture of a primary amine and a secondary amine such that the molar ratio of the amines to polyaniline tetramer repeat unit is between 0.1 and 5.0, forming thereby a solution; and dissolving polyaniline having $(M_w) \geq 130,000$ and $(M_n) \geq 30,000$ in the solution thus prepared, whereby a solution is formed which is stable over a chosen time period.

In another aspect of the invention, in accordance with its objects and purposes, as embodied and broadly described herein, the method for preparing solutions having >20% by weight of $(M_w)$<120,000, $(M_n)$<30,000 (low-molecular weight) emeraldine base form of polyaniline hereof includes the steps of: mixing a solvent for polyaniline with a primary amine, a secondary or a tertiary amine or mixtures thereof such that the molar ratio of the amine to polyaniline tetramer repeat unit is between 0.1 and 5.0, forming thereby a solution; and dissolving polyaniline having $(M_w)$<120,000, $(M_n)$<30,000 in the solution thus prepared, whereby a solution is formed which is stable over a chosen time period.

In yet another embodiment of the invention, in accordance with its objects and purposes, as embodied and broadly described herein, the method for preparing solutions having >20% by weight of $(M_w)$<120,000, $(M_n)$<30,000 emeraldine base form of polyaniline hereof includes the step of dissolving a chosen amount of polyaniline having $(M_w)$<120,000, $(M_n)$<30,000 in a bifunctional solvent therefor having both an amide group and an amine group the bifunctional solvent, forming thereby a solution which is stable over a chosen time period.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 is a schematic representation of the repeat unit for polyaniline, where

FIG. 1b illustrates the semiconducting (bipolaron) form obtained by immersion of the polymer in acid solutions having a pH in the range between 7 and 2, while

FIG. 2 is a schematic representation of interchain hydrogen bonding in EB,

FIG. 2a illustrating the interaction between imine nitrogens on one chain and the hydrogen atom bonded to the secondary amine of an adjacent chain, while

DETAILED DESCRIPTION OF THE INVENTION

Figure 1A:
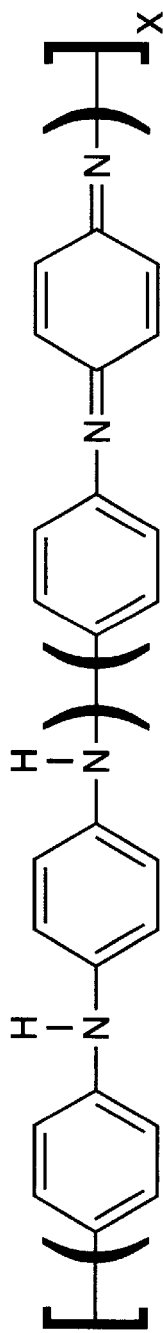
FIG. 1a illustrates the emeraldine base (EB) form thereof.

Briefly, the present invention includes the addition of gel inhibitors (GIs) to solutions of polyaniline emeraldine base in order to permit high concentrations (15–40% w/w) of high-molecular weight polyanilines [$M_w \geq 120,000$; $M_n \geq 30,000$] to remain stable and particle-free for sufficient time to fabricate desired articles therefrom. Production of high-quality fibers possessing good mechanical properties requires concentrations of the chosen polymer in the 15–40% w/w range. Solutions prepared according to the teachings of the present invention are generally stable for between several hours and 2 weeks and solutions having such gelation times were found to generate spun articles which maintain mechanical properties as well as conductivity after acid doping. In order to achieve highly concentrated (15–40%) true solutions of high-molecular weight emeraldine base (EB) in polar aprotic organic solvents, certain primary and secondary amine compounds are added to EB dispersions in a solvent. For highly concentrated solutions (>20% w/w) of low-molecular weight polyaniline [$M_w < 120,000$; $M_n < 30,000$], certain primary, secondary or tertiary amines may be employed. Neither the solvents nor the amine compounds used are suitable by themselves to obtain high polymer concentrations in solution. Polymer solutions were formed by dissolving a solid polymer in an appropriate liquid solvent, thereby forming a flowable, particle-free liquid phase which has a viscosity (measure of the force required to induce flow) greater than that of the neat solvent. It is believed by the present inventors that the gel inhibitor subsequently complexes with the tetramer repeat unit imine nitrogens, and provides a "dielectric shielding" which inhibits the natural tendency for EB chains to aggregate and gel at high concentrations by formation of interchain imine-amine hydrogen bonds. Such additives are used in small amounts in a range of molar ratios of GI to EB tetramer repeat unit of 0.1 to 5.0, more preferably in the range of 0.5 to 3.0, and most preferably in the range from 1 to 2. Greater quantities of gel-inhibitors, as might be used if one were using cosolvents, have been found to deteriorate the resulting polymer articles by causing embrittlement. This is especially true following doping with an acid after thermal evaporation of the solvent, so as to render said article conductive. An article with poor mechanical properties and/or significantly reduced conductivity results. Suprisingly however, films fibers or other articles prepared by immersion precipitation and/or coagulation retain excellent mechanical properties; that is, flex, modulus, etc., and may be rendered highly conductive after exposure to an acid.

Gels are compositions of matter which are between a solid polymer phase and the liquid solution phase; gelation is a natural process which occurs when a polymeric gel network forms as neighboring chains in solution establish physical crosslinks through, for example, hydrogen bonds or dipole-dipole interactions, the result being an abrupt increase in viscosity (by a factor of at least 2 orders of magnitude).

The amines are called "gel-inhibitors" since these basic additives serve the functions of: a) dissolving the polymer; b) decreasing overall solution viscosity; and c) prolonging the shelf life of the polymer solutions by inhibiting gelation. It is believed by the present inventors that the mechanism for this phenomenon is related to the formation of a hydrogen-bond adducts between the protons of primary and secondary amine gel-inhibitors and the lone pair of electrons on the imine nitrogen in the EB, and the formation of hydrogen-bond adducts between the protons from the secondary amines of the polymer repeat unit and the lone pair of electrons donated by primary, secondary and tertiary gel-inhibitors. Additionally, Pernigraniline base can only form hydrogen bonds with primary and secondary amines, while Leucoemeraldine, in a similar manner to EB, is capable of forming hydrogen bonds with primary, secondary and tertiary amines used as gel-inhibitors. For primary and secondary amine gel-inhibitors, gelation times increase as the GI/EB molar ratio in the concentrated solution increases.

Adjusting the GI/EB molar ratio (GI being pyrrolidine) also has a significant impact on both the mechanical properties and the conductivity of the resulting films and membranes; increasing the GI/EB molar ratio to 5 in a solution with N-methyl-2-pyrrolidinone (NMP) as a solvent, results in brittle films having doped-film conductivity of $10^{-5}$ S/cm, which is 5 orders-of-magnitude lower than films prepared from a concentration solution having a GI/EB molar ratio of 0.2. Similarly, using pyrrolidine as solvent or cosolvent to process emeraldine base powder results in a concurrent reduction and substitution reaction with EB powder, similar to that found by Han and Jeng, supra. Nuclear magnetic resonance (NMR) and infrared (IR) spectra show that the chemical structure of the final product is the substituted leucoemeraldine base. By contrast, $^{13}C$ solid-state NMR and IR spectra of fiber articles spun from concentrated (20% w/w) EB/NMP/heptamethyleneimine (HPMI) solutions having a GI/EB molar ratio of 1.06 (gelation time ~20 hr. at 25° C.) show that the EB fiber has the same chemical structure as that of the starting EB powder. Infrared spectroscopy also confirms that the fiber is not reduced by the gel-inhibitor; the 1598 cm$^{-1}$ peak assigned to the C=C bond of the quinone ring remains the same as that for EB powder, while if excess pyrrolidine was used, the 1598 cm$^{-1}$ peak disappears.

Low-molecular weight polyaniline emeraldine base is designated as polyanitine synthesized at below 0° C. following the procedure reported by MacDiarmid et al., supra, while high-molecular weight polyaniline is synthesized at −45° C.

The preparation of polyaniline used in the EXAMPLES hereinbelow is now described. Such high molecular weight materials are also readily prepared by emulsion polymerization procedures (See Y. Cao and J. Osterholm, "Electrically Conducting Polyaniline: Method for Emulsion Polymerization", U.S. Pat. No. 5,324,453, issued 1994.). The solubility characteristics of these high molecular weight polyaniline emeraldine bases behave identically to those described herein.

Figure 1B:
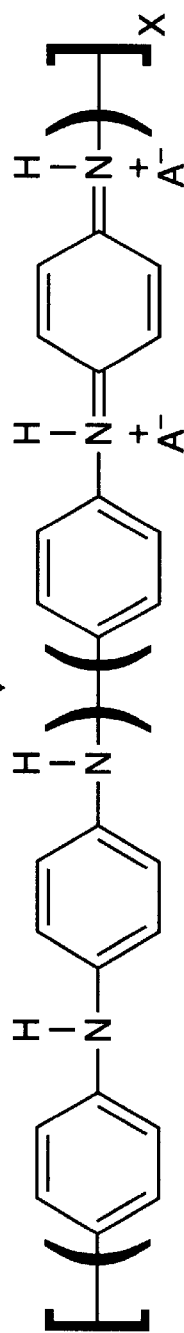
Figure 1C:
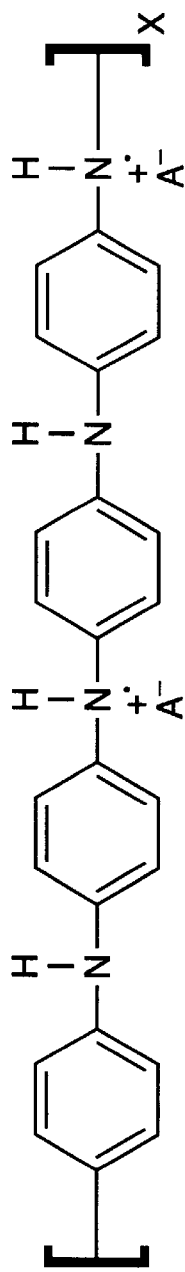
FIG. 1c illustrates the highly conducting (polaron) form obtained by immersion of the polymer in acid solutions having a pH<2.

High-molecular weight polyaniline (HMW EB) was synthesized at −45° C. using a cyclohexanone/$CO_2$ ice bath. In a typical reaction, 100 g (1.074 mole) of aniline was dissolved in 1500 ml of 1M HCl and aqueous 5 M LiCl solution. The solution was transferred to a 4 L resin kettle, and subsequently immersed in a cyclohexanone/CO2 ice bath, where it was mechanically stirred throughout the course of the reaction. After One hour the reaction temperature of the aniline solution reached a temperature of −45° C. Ammonium persulphate [131 g (0.574 mole)] was dissolved in a separate flask which contained 1200 ml of 1M HCl and 5M LiCl solution at room temperature (≈20° C.). This oxidant solution is then added to the aniline solution at a rate of 8 mL/min. by means of a metered syringe pump. Thirty minutes after the first addition of ammonium persulphate solution the reaction mixture appeared pink in color, changing to intense orange after about 3 hr. Twenty-four hours later, the solution was bluish green in color indicating the formation of doped polyaniline in it's emeraldine hydrochloride form (FIG. 1c). The reaction mixture was continuous stirred vigorously at 45° C. for an additional 48 hr. At that time the temperature of the mixture was allowed to slowly increase to 0° C. The resulting polyaniline emeraldine hydrochloride powder occupied the entire volume of the reaction flask, and it appeared bulky and fibrous as compared to polyaniline emeraldine hydrochloride powders prepared at 0° C. without LiCl.

The emeraldine hydrochloride powder was collected by vacuum filtration and, subsequently washed with 2 L increments of 1M HCl until the filtrate become colorless. The powder was then washed with 2 L of water and transferred to a 4 L beaker containing 2.5 L of 0.1 N $NH_4OH$ solution, stirred for 1 hr., and subsequently vacuum filtered to collect the deprotonated emeraldine base powder (FIG. 1a). The polymer was reacted with another 2.5 L of 0.1 N $NH_4OH$ aqueous solution for another hour, and subsequently vacuum filtered to recover the EB powder. The emeraldine base polymer was dried under dynamic vacuum at $10^{-2}$ torr for more than 72 hr. to remove residual water. Polymer yields were typically 40% to 45%. An identical synthetic procedure was performed at a slightly higher reaction temperature of −15° C. utilizing a polyethylene glycol/dry ice slurry as the cooling bath and gave similar yields.

The molecular weight of polyaniline synthesized at −15° C. and −45° C. in 5M LiCl/1M HCl have similar molecular weights as indicated in Table 1 which shows gel permeation chromatography (GPC) results for high-molecular weight polyanilines synthesized under the varying conditions described above. The measurements of molecular weight were performed using GPC on 0.1% (w/w) solutions of EB in NMP at room temperature with a linear column employing a UV detector to monitor 320 nm transmitted light. Molecular weights were derived from polystyrene standards analyzed under identical elution conditions. The polydispersity of the samples ($M_w/M_n$) were difficult to determine accurately due to poor chromatographic resolution of the bimodal peak distributions.

TABLE 1

| Sample | Synthetic Conditions | $M_n$ | $M_w$ |
|---|---|---|---|
| 1 | −15° C., 5 M LiCl, 1 M HCl | 33,371 | 618,614 |
| 2 | −15° C., 5 M LiCl, 1 M HCl | 67,016 | 680,501 |
| 3 | −45° C., 5 M LiCl, 1 M HCl | 70,033 | 494,785 |

It is known that the GPC analysis of the synthesized polyaniline emeraldine base (EB) in NMP solution has a bimodal molecular weight distribution. This is likely due to the aggregation of the polyaniline in the NMP. Such phenomenon maybe resolved by adding LiCl to the NMP solution. The GPC results presented in Table 1 were obtained without the addition of LiCl to the NMP solutions for comparison to known reference chromatograms. It is clear that each of the polyaniline samples are of high-molecular weight, [$(M_w) \geq 120,000$ and $(M_n) \geq 30,000$]. It is also apparent that the molecular, weight of these samples are significantly higher than the polyaniline synthesized at 0° C. (See M. Angelopoulos, et al, "LiCl Induced Morphological Changes in Polyaniline Base and Their Effect on the Electronic Properties of the Doped Form", Macromolecules, 29, 8, 3046) without LiCl added to depress the freezing point of water in the reaction mixture, as is most frequently cited in the literature.

Low-molecular weight polyaniline (LMW EB) was synthesized according to the procedure of A. G. MacDiarmid et al. in *Conducting Polymers*, L. Alcacer ed., Riedel Publishers, 1986, pages 105–120 as follows: 80 ml of aniline is dissolved in 1200 ml of 1M HCl aqueous solution in a 4L beaker and cooled to ≈1° C. by stirring the solution in a LiCl/ice/$H_2O$ bath. Forty-six grams of ammonium persulfate ($(NH_4)_2S_2O_8$) is dissolved in 1300 ml of 1M HCl aqueous solution and separately cooled to ≈1° C. by stirring the solution in a LiCl/ice/$H_2O$ bath. The LiCl/ice/$H_2O$ bath temperature was controlled at ≈−5° C., since the exothermic reaction resulting from the mixing of the two solutions will raise the temperature of the mixture and it is desirable to maintain the temperature below ≈4° C. The ammonium persulfate solution was added to the aniline solution in less than 30 seconds during which time the mixture was vigorously stirred. In less than 10 min., the solution turned a blue color, then dark green. The temperature was maintained in the range between 0° C. and 3° C. during the course of the reaction. The solution was stirred for 2 hr. before the reaction was terminated. The powder was collected by vacuum filtration and washed with 1 L increments of 1M HCl until the filtrate became clear. The washed powder was then further washed with 3 L of 0.1 N $NH_4OH$ solution, stirred overnight, and subsequently vacuum filtered to obtain the EB powder. The polymer was then evacuated using a vacuum pump for more than 72 hr. at $10^{-2}$ torr to ensure that any residual moisture was removed. The yield was approximately 30%.

To form films from the polyaniline solutions, a solution is spread onto glass, metal or ceramic plates and formed into flat wet film sheets of desired thickness by means of a gardener's blade. The thickness of the film is generally adjusted to be in the range from 2–4 mil (50–100 $\mu$m). The film is then heated at 120° C. in a convective oven for 1–2 hr. forming a thermally annealed film or coating. Films may also be formed by immersing the solution in a polymer nonsolvent, typically water, for greater than 10 hr. to form an immersion precipitation film. The films may then be immersed in any desirable pH solution for up to several hours (typically, 1N HCl for 1 h), removed, wiped dry and air dried for about an hour. The mechanical integrity of an acid-doped film is generally determined by a simple flex test: if the film can be manually flexed 180° without breaking, it is considered to be flexible (F); if it fractures or breaks it is considered brittle (B) If the film or coating does not easily delaminate during the peel off from the casting substrate, and if the film or coating substrate is scratched from the perimeter with a razor blade so that the polymer flakes or shatters into pieces, it is considered as very brittle (VB).

In order to dope the films so prepared, 6 in. segments of either stretched or unstretched film were immersed in 400 ml of aqueous acid solutions for 48 hr., removed from the doping solution, dried under dynamic vacuum for another 48 hr. conductivity was measured by a 4-probe DC method (See, e.g., Vander Pauw, L. J. Phillips Technical Review 20, 220 (1958)), after a colloidal graphite suspension applied to the polyaniline films to make high-quality ohmic contacts. The acid solutions used for doping the films were: 1.5 N HCl, 1N acetic acid, and an aqueous solution of benzene phosphinic acid (BPA) having a pH=−0.37.

Solvents effective for preparing solutions between 15% w/w and 40% w/w of high olecular weight EB include: n-methyl-2-pyrrolidinone, n-ethyl-2-pyrrolidinone, 1-cyclohexyl-2-pyrrolidinone, 1-methyl-2-piperidone, n-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 4-acetylmorpholine, 1-acetyl-3-methylpiperidine, n,n-dimethylpropionamide, N,N,N',N'-tetramethyurea, N,N-dimethylacetamide, dimethylsulfoxide, tetrametylene sulfoxide, hexamethylphosphoramide, δ-valerolactam, N,N-2-trimethylpropionamide, and mixtures thereof, when mixed with the secondary amines which include: 2-methylaziridine, azetidine, pyrrolidine, piperidine, hexamethyleneimine, heptamethyleneimine, 3-pyrroline, 3-pyrrolidinol, (R)-(−)-pyrrolidine-2-methanol, (S)-(+)-pyrrolidine-2-methanol, 4-ethyl-2-methyl-(3-methylbutyl) oxazolidine, (S)-(+)-(anilinomethyl)pyrrolidine, 1,3,3-trimethyl-6-azabicyclo[3,2,1]octane, (S)-(+)-2-(methoxymethyl) pyrrolidine, indoline, thiomorpholine, decahydroquinoline, 2,6-dimethylmorpholine, diethylamine, dicyclohexylamine, dipropylamine, dibutylamine, N-methylhexylamine, 1-aza-15-crown-5, 1,2,3,6-tetrahydropyridine, 1,4,5,6-tetrahydropyrimidine, 1,4-dioxa-8-azaspiro[4.5]-decane, 3,3-dimethylpiperidine, morpholine, and 3,5-dimethylpiperidine, and mixtures thereof as gel inhibitors, have already been described in the parent patent application to the present application. These same solvents are used in accordance with the teachings of the present invention with primary and tertiary amines as gel inhibitors to prepare concentrated solutions of low- and high-molecular weight EB. It is believed by the present inventors that mixtures of primary, secondary and tertiary amine gel inhibitors will provide similar gel inhibition properties to those observed for the each class of amines used by itself. The bifunctional solvents: 1-acetylpiperazine, 1-(3-aminopropyl)-2-(pyrrolidinone), N,N-diethyinipecotamide, and mixtures thereof have also been found to be useful in the preparation of LMW EB solutions.

Figure 2A:
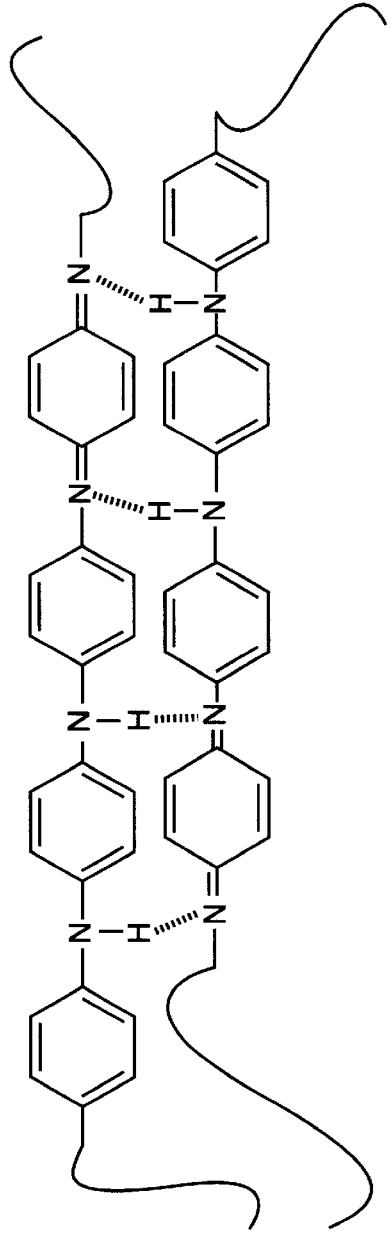
Figure 2B:
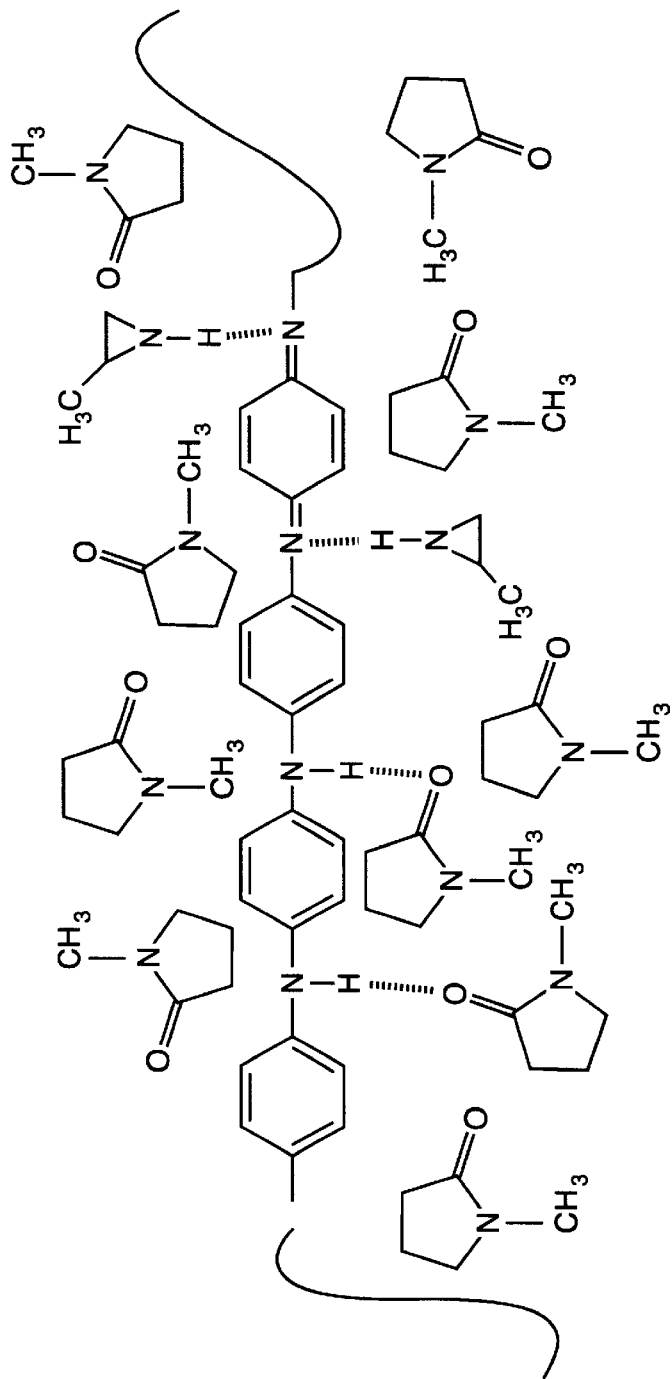
FIG. 2b illustrates one of the gel inhibitors (GIs) of the present invention, 2-methylaziridine, a secondary amine, forming hydrogen bonds with the imine nitrogens of a solvated EB chain, thereby inhibiting the interchain polymer associations through the hydrogen bond formation mechanism illustrated in FIG. 2a, hereof, and further forming a dielectric shield by screening the imine nitrogens, thereby producing enhanced solubility in the presence of a solvent such as N-methyl-2-pyrrolidinone (NMP).

Reference will now be made in detail to the present preferred embodiments of the invention examples of which are illustrated in the accompanying drawings. Turning now to FIG. 1, shown is a schematic representation of the repeat unit for polyaniline, where FIG. 1a illustrates the emeraldine base (EB) form thereof, FIG. 1b illustrates the semiconducting (bipolaron) form obtained by immersion of the polymer in acid solutions having a pH in the range between 7 and 2, while FIG. 1c illustrates the highly conducting (polaron) form obtained by immersion of the polymer in acid solutions having a pH<2. FIG. 2 is a schematic representation of interchain hydrogen bonding in EB, FIG. 2a illustrating the interaction between imine nitrogens on one chain and the hydrogen atom bonded to the secondary amine of an adjacent chain, while FIG. 2b illustrates one of the gel inhibitors (GIs) of the present invention, 2-methylaziridine, forming hydrogen bonds with the imine nitrogens of a solvated EB chain, thereby inhibiting the interchain polymer associations through the hydrogen bond formation mechanism illustrated in FIG. 2a, hereof, and further forming a dielectric shield by screening the imine nitrogens, thereby producing enhanced solubility in the presence of a solvent such as N-methyl-2-pyrrolidinone (NMP).

As stated hereinabove, NMP, N,N,N'N'-tetramethylurea, and DMPU are the best known solvents for EB. Higher concentrations of EB (>5% w/w) in such solvents leads to rapid gelation due to strong intermolecular hydrogen bonding between polyaniline chains, and decreases in the solubility of EB is directly related to increases in the molecular weight of the polymer. The interaction between the amine functionality of the EB tetramer repeat unit and the carbonyl (C=O) or phosphonyl (P=O) or sulfonyl (S=O) groups of these solvents is thought to be responsible for the solubility of this material in such solvents. It is important to note that the imine nitrogens are not presumed to be hydrogen bonded with the solvent molecules. If the solute concentration is <2% w/w, intermolecular hydrogen bonding between EB molecules is less likely to occur in view of the increased spacing between the molecules. Thus, such solutions remain stable and particle-free for a significant amount of time. However, as the concentration is increased, EB molecules become more closely disposed and a number of the secondary amine nitrogens unbonded by the solvent may hydrogen bond to the imine nitrogens of adjacent polymer chains. See, FIG. 2a hereof. Gelation will then occur in a shortened time period, and stable, particle-free solutions become difficult to prepare. For EB molecular weights $M_w$>300,000 (very high-molecular weight), such hydrogen bonding may occur in a short time period even for solutions having <5% w/w of EB.

Having generally described the invention, the following EXAMPLES are proffered in order to instruct those skilled in the art of polymer processing on the practice of adding gel-inhibitors to solutions comprised of EB and a solvent in order to control solution viscosity, inhibit time to gelation, maintain particle and gel free solutions, and to form films, fibers, coatings and other articles, which may be further treated to impart electrically conductivity.

EXAMPLE 1

A solution of 0.600 g ($8.44 \times 10^{-3}$ mole) of pyrrolidine (Py) combined with 0.490 g of NMP was heated to 68° C. for about 10 min. 0.305 g ($8.43 \times 10^{-4}$ mole) of HMW EB (21% w/w) was added to the hot solution with stirring. This gave a GI/EB molar ratio of 10. The resulting mixture was stirred for several minutes. Most of the EB dissolved. After heating for an additional 5 min. a homogenous solution formed, and a dense film was produced by spreading the solution onto a glass plate which was then thermally annealed at 120° C. for approximately 2 h to remove the casting solution. Another wet film was formed by spreading a portion of the solution onto a glass plate and immediately immersed into a water bath, whereupon the polymer precipitated to form a film. Both films were found to be very brittle before acid doping treatments, and the thermally annealed film was noticed to be more of a powder than a film when removed from the glass substrate by means of razor blade. This is in contrast to the same preparation performed with 1.02 g of NMP and 0.082 g ($1.16 \times 10^{-3}$ mole) of pyrrolidine, and 0.304 g of EB (GI/EB molar ratio=1.4) where a flexible, thermally cured dense film was obtained. This example shows that a gel inhibitor such as pyrrolidine is not a cosolvent for polyaniline and, while providing enhanced solubility, a molar excess of Py beyond the claims of the present invention, adversely effects the mechanical properties of the film or coating most likely through chemical degradation of the polymer.

EXAMPLE 2

To a solution of 0.621 g ($6.14 \times 10^{-3}$ mole) of dipropylamine and 0.512 g of NMP, which was heated at 68° C. for about 10 min., 0.305 g ($8.47 \times 10^{-4}$ mole) of HMW EB was added (GI/EB=7.25), and the resulting solution stirred for several minutes. A pasty polyaniline EB powder which did not dissolve was the observed product. After further heating for approximately 30 min., no solubility improvement occurred. Thus, a 20% w/w flowable liquid of EB was not possible to prepare under these conditions. This is to be contrasted to a solution of 1.02 g of NMP, 0.305 g ($8.47 \times 10^{-4}$ mole) of EB, and 0.108 g ($1.07 \times 10^{-3}$ mole) of dipropylamine (GI/EB=1.26) which, after the same heating procedure described above, generated a (20% w/w) polyaniline solution which could be formed into flexible films by thermal annealing or immersion precipitation, and when doped in 1 N HCl gave high conductivity (>1 S/cm). This example shows that gel inhibitors such as dipropylamine are not cosolvents for polyaniline, but in fact, at elevated concentrations they are nonsolvents for the polymer.

Similarly, to a solution of 0.512 g of NMP and 0.550 g ($3.95 \times 10^{-3}$ mole) of decahydroquinoline, which was heated to 68° C. for about 10 min., 0.305 g ($8.43 \times 10^{-4}$ mole) of EB was added and the resulting mixture (GI/EB=4.72) stirred for several minutes. A clear solution was observed. The solution was heated for an additional 5 min., but a pasty precipitate and/or gel was observed. Upon attempting to cast this gel into a dense film, cracks were observed in the resulting film. This is in contrast to the same procedure applied to 1.0 g of NMP and 0.16 g ($1.15 \times 10^{-3}$ mole) of decahydroquinoline, where a 20% w/w polyaniline solution (GI/EB=1.36) was observed to be stable against gel formation for more than 10 min. at 68° C. This example shows the sensitivity of GI concentration to resulting gelation time and film quality.

EXAMPLE 3

The following secondary amines, which are themselves good gel inhibitors, were used as solvents in an attempt to make ~20% (w/w) flowable liquid solutions with high-molecular weight (HMW) emeraldine base at 60° C.: 1) 22 mg ($6.1 \times 10^{-5}$ mole) of EB was added to 80 mg ($7.8 \times 10^{-4}$ mole) of hot dipropylamine (GI/EB=12.8) with vigorous mixing, but the dipropylamine only wet and swelled the EB powder; 2) 20 mg ($5.5 \times 10^{-5}$ mole) of EB was added to 79 mg ($6.1 \times 10^{-4}$ mole) of dibutylamine (GI/EB=11.1), but the dibutylamine only wet and swelled the EB powder; 3) 22 mg ($6.1 \times 10^{-5}$ mole) of EB was added to 79 mg ($9.5 \times 10^{-4}$ mole) of 1,2,3,6-tetrahydropyridine (GI/EB=15.6) which immediately gelled upon mixing with the EB powder; 4) 21 mg ($5.2 \times 10^{-5}$ mole) of EB was added to 80 mg ($7.1 \times 10^{-4}$ mole) of heptamethyleneimine (GI/EB=12.2), but the heptamethyleneimine only wet and swelled the EB powder; and, 5) 19 mg ($5.2 \times 10^{-5}$ mole) of EB was added to 80 mg ($6.9 \times 10^{-4}$ mole) of 2,6-dimethylmorpholine (GI/EB=13.3), but the 2,6-dimethylmorpholine only wet and swelled the EB powder. These example show that GI's are not by themselves good solvents for the emeraldine base form of polyaniline. They also indicate that gel inhibitors are typically nonsolvents for EB at the higher total solids content of the present invention. One exception follows in the next example.

EXAMPLE 4

It might be expected that a bifunctional molecule containing both a primary or secondary amine group (to complex with imine nitrogens of the polymer) and an amide group (to solvate the secondary amine groups of the polymer) would be simultaneously a gel-inhibitor and a solvent, and hence dissolve >15% w/w HMW EB. One such bifunctional compound is 1-acetylpiperazine. This molecule has a secondary amine and an amide functional group situated within its heterocyclic ring structure. The bifunctionality gives rise to good solvent solubility characteristics, and provides the secondary amine structure common to gel inhibitors. Specifically, 1.186 g of 1-acetylpiperazine was added to a 10 ml PTFE screw-cap vial and heated to 100° C. for 20 min. To this solvent, 308 mg of polyaniline was quickly added with vigorous stirring for several minutes. The solution became homogeneous and free from gel particles in a short time. A thermally annealed film and an immersion precipitation film were prepared in the usual fashion. Both films were of flexible and, of high quality and had high conductivities after doping in 1 N HCl. This example shows that certain bifunctional compounds can be used advantageously to dissolve EB at concentrations >20% w/w. However, the resulting solutions had short gelation times which could be lengthened by the addition of small amounts of other gel inhibitors. Table 2 provides a list of three bifunctional group molecules suitable as solvents for high concentrations of EB. Unless otherwise specified, EB is defined to be either low- or high-molecular weight EB.

TABLE 2

Bifunctional group
Gel Inhibitor 1-(3-aminopropyl)-2-pyrrolidinone

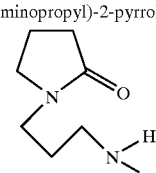

1-acetylpiperazine
0.143

TABLE 2-continued

Bifunctional group Gel Inhibitor

N,N-diethylnipecotamide

EXAMPLE 5

Table 3 shows the results of 14 experiments using different gel-inhibitor compounds prepared with NMP solutions containing emeraldine base in the range of 19 to 21% (w/w), and variable amounts of GI to EB ranging from 0.7 to 2.8 (2.5 to 5.0 in the case of 2-methylaziridine (2MA)). Table 3 also lists the subsequent doping effects on the conductivities (s=S/cm) and mechanical integrity of these thermally annealed films. The films indicated "Very Brittle" could not be measured for bulk conductivity. These results show that the physical properties (conductivity and mechanical properties) of thermally annealed films are sensitive to the mixing stoichiometry of the gel inhibitor relative to the EB repeat unit. In all instances, except for 2-methylaziridine, there is a significant decrease of bulk conductivity with increasing molar ratios of GI to EB. This example again shows that gel inhibitors are not cosolvents and that acid doped film and coating properties are quite sensitive to the molar ratio of GI to EB.

TABLE 3

| Gel Inhibitor (Gl) | Mole Ratio Gl/EB | σ (S/cm) | Mechanical Property |
|---|---|---|---|
| pyrrolidine | 1.3 | $3.1 \times 10^{-2}$ | F |
|  | 2.5 | $2.5 \times 10^{-5}$ | B |
| 2-methylaziridine | 2.5 | 15 | F |
|  | 5.0 | 3.5 | B |

TABLE 3-continued

| Gel Inhibitor (Gl) | Mole Ratio Gl/EB | σ (S/cm) | Mechanical Property |
|---|---|---|---|
| (S) − (+) pyrrolidine-2-methanol | 0.72 |  | F |
|  | 1.4 | $2.8 \times 10^{-3}$ | VB |
|  |  | NM |  |
| 3-pyrroline | 1.4 | $2.8 \times 10^{-4}$ | F |
|  | 2.8 | NM | VB |
| 3-pyrrolidinol | 1.4 |  | F |
|  | 2.8 | $7.0 \times 10^{-5}$ | VB |
|  |  | NM |  |
| Dipropylamine | 1.3 | 30.0 | F |
|  | 2.4 | $3.2 \times 10^{-2}$ | F |
| Dibutylamine | 1.2 | 37.5 | F |
|  | 1.69 | $4.2 \times 10^{-2}$ | F |

NM = Not Measurable; F = Flexible; and B = Brittle.

EXAMPLE 6

Table 4 presents a summary of the results from 60 "quick survey" experiments in which variable quantities of gel inhibitors were added to NMP solutions to dissolve ~300 mg ($8.3 \times 10^{-4}$ mole) of emeraldine base as described above, except for the (S)-(+)-2-(methoxymethyl)-pyrrolidine entry, where only 30 mg ($8.3 \times 10^{-4}$ mole) of polyaniline was used due to the limited availability of this GI. In all cases, the concentration was greater than 20% w/w. Table 4 shows the differences in measured conductivity between the HCl acid-doped thermally annealed films and HCl-doped immersion precipitation (IP) films formed by coagulating the wet film casting solutions in a nonsolvent (water) bath.

The data in Table 4 show that in general, the IP films have higher conductivities than do the thermally cured dense films, and the resulting conductivities can differ between 0 to 5 orders of magnitude. These results suggest that immersion precipitation leads to effective removal of the residual GI by solvent exchange with the water bath. The "brittleness" found for the IP films are a consequence of the interconnecting pore structures observed by scanning electron microscopy (SEM). In a series of separate experiments, it was discovered that the addition of LiCl salts to the water coagulation bath leads to a noninterconnected, closed-cell, pore morphology which yields more mechanically robust and nonbrittle films. Modifications of the physical properties for thermally annealed and IP films and coatings can be achieved by varying: 1. the total mass of polymer in the solution at a constant GI/EB ratio; 2. the dielectric properties of the nonsolvent used for the coagulation bath, that is, adding salts; and 3. the nature of the acid used for doping the polymer, that is, organic acids vs. inorganic acids.

TABLE 4

| Solvent (NMP) (g) | Gel Inhibitor (g) | Conductivity of the Thermally Annealed Film (S/cm) | Conductivity of the Immersion Precipitated Film (S/cm) | Molar Ratio of GI/EB |
|---|---|---|---|---|
| 1.025 | 2-methylaziridine 0.120 | 15.0 (F) | 3.4 (SF) | 2.54 |
| 1.02 | Azitidine 0.090 | $10^{-5}$ (B) | NA | 1.9 |
| 1.02 | Pyrrolidine 0.082 | $4 \times 10^{-2}$ (F) | 0.11 (SF) | 1.39 |
| 1.025 | Hexamethylene-imine 0.104 | $3.7 \times 10^{-3}$ (F) | 5.1 (SF) | 1.26 |

TABLE 4-continued

| Solvent (NMP) (g) | Gel Inhibitor (g) | Conductivity of the Thermally Annealed Film (S/cm) | Conductivity of the Immersion Precipitated Film (S/cm) | Molar Ratio of GI/EB |
|---|---|---|---|---|
| 1.034 | Heptamethylene-imine 0.104 | $5.73 \times 10^{-2}$ (F) | 2.5 (SF) | 1.11 |
| 1.031 | 3-pyrroline 0.080 | $2.8 \times 10^{-4}$ (F) | $2 \times 10^{-2}$ (SF) | 1.40 |
| 1.021 | 3-pyrrolidinol 0.101 | $7 \times 10^{-5}$ (F) | $4.37 \times 10^{-2}$ (SF) | 1.40 |
| 1.051 | (S)-(+)-pyrrolidine-2-methanol 0.060 | $1.3 \times 10-3$ (F) | 0.58 (SF) | 0.72 |
| 1.02 | (R)-(−)-pyrrolidine-2-methanol 0.060 | $2.8 \times 10-3$ (F) | 0.25 (SF) | 0.72 |
| 1.02 | 4-ethyl-2-methyl-(3-methylbutyl)-oxazolidine 0.237 | 0.10 (F) | NA | 1.54 |
| 1.02 | (S)-(+)-(anilinomethyl)-pyrrolidine 0.215 | NM | $1.8 \times 10^{-2}$ (B) | 1.47 |
| 1.03 | 1,3,3-trimethyl-6-azabicyclo[3,2,1]-octane 0.195 | $1.1 \times 10^{-4}$ (F) | 0.14 (B) | 1.53 |
| 0.110 | (S)-(+)-2-(methoxymethyl)-pyrrolidine 0.015 | $1.1 \times 10^{-4}$ (F) | 8.5 (B) | 1.57 |
| 1.075 | indoline 0.148 | $5.5 \times 10^{-5}$ (F) | 0.54 (B) | 1.50 |
| 1.031 | Thiomorpholine 0.162 | $6.4 \times 10^{-1}$ (F) | $2.2 \times 10^{-2}$ (B) | 1.89 |
| 0.98 | Decahydroquinoline 0.160 | 0.17 (F) | 12.5 (F) | 1.39 |
| 1.004 | 2,5-dimethyl-morpholine 0.122 | $7.4 \times 10^{-3}$ (F) | $4 \times 10^{-2}$ (B) | 1.28 |
| 1.029 | Diethylamine 0.087 | 28.2 (F) | 14.0 (B) | 1.43 |
| 1.029 | dicyclohexyl-amine 0.205 | 78.0 (F) | 22.0 (B) | 1.36 |
| 1.048 | Dipropylamine 0.108 | 30 (F) | 12.5 (B) | 1.29 |
| 1.024 | Dibutylamine 0.124 | 37.5 (F) | 11.1 (B) | 1.16 |
| 1.032 | N-methylhexyl-amine 0.124 | 1.0 (F) | 1.2 (SF) | 1.30 |
| 1.05 | 1-aza-15-crown-5 0.248 | 3.0 (F) | 21.3 (SF) | 1.36 |
| 1.064 | 1,4-dioxa-8-azaspiro[4.5]-decane 0.155 | $1.5 \times 10^{-2}$ (F) | $7.5 \times 10^{-2}$ (F) | 1.31 |
| 1.026 | 1,4,5,6-tetrahydro-pyrimidine | $4.2 \times 10^{-2}$ (F) | 3.9 (SF) | 1.61 |
| 1.023 | 1,2,3,6-tetrahydro-pyridine | $4.2 \times 10^{-3}$ (F) | 0.33 (SF) | 1.41 |
| 1.025 | 3,5-dimethyl-piperidine | $2.4 \times 10^{-3}$ (F) | 1.53 (SF) | 1.63 |
| 1.020 | 3,3-dimethylpiperidine 0.118 | $9.3 \times 10^{-4}$ (F) | 0.11 (SF) | 1.48 |
| 1.558 | Morpholine 0.110 | $1.2 \times 10^{-3}$ (F) | 0.18 (SF) | 1.25 |
| 1.038 | Piperidine 0.112 | $2.6 \times 10^{-5}$ (F) | 0.16 (SF) | 2.3 |

NA means not available;
SF means semiflexible - the film can be flexed between 90° and 180° without cracking; and
B means brittle - the film can be flexed less than 90° without cracking.

The data from Table 4 show that there are many gel-inhibitors which, when used in the preferred concentration ranges of the present invention, may be preferentially employed to dissolve greater than 20% w/w of HMW EB. These solutions can be advantageously used to fabricate thermally annealed free-standing films or coatings that may be rendered electrically conductive by immersion in an acid. Similarly, these solutions can be used advantageously to fabricate articles such as interconnecting and noninterconnecting porous articles by immersion precipitation into nonsolvents.

EXAMPLE 7

Figure 3:
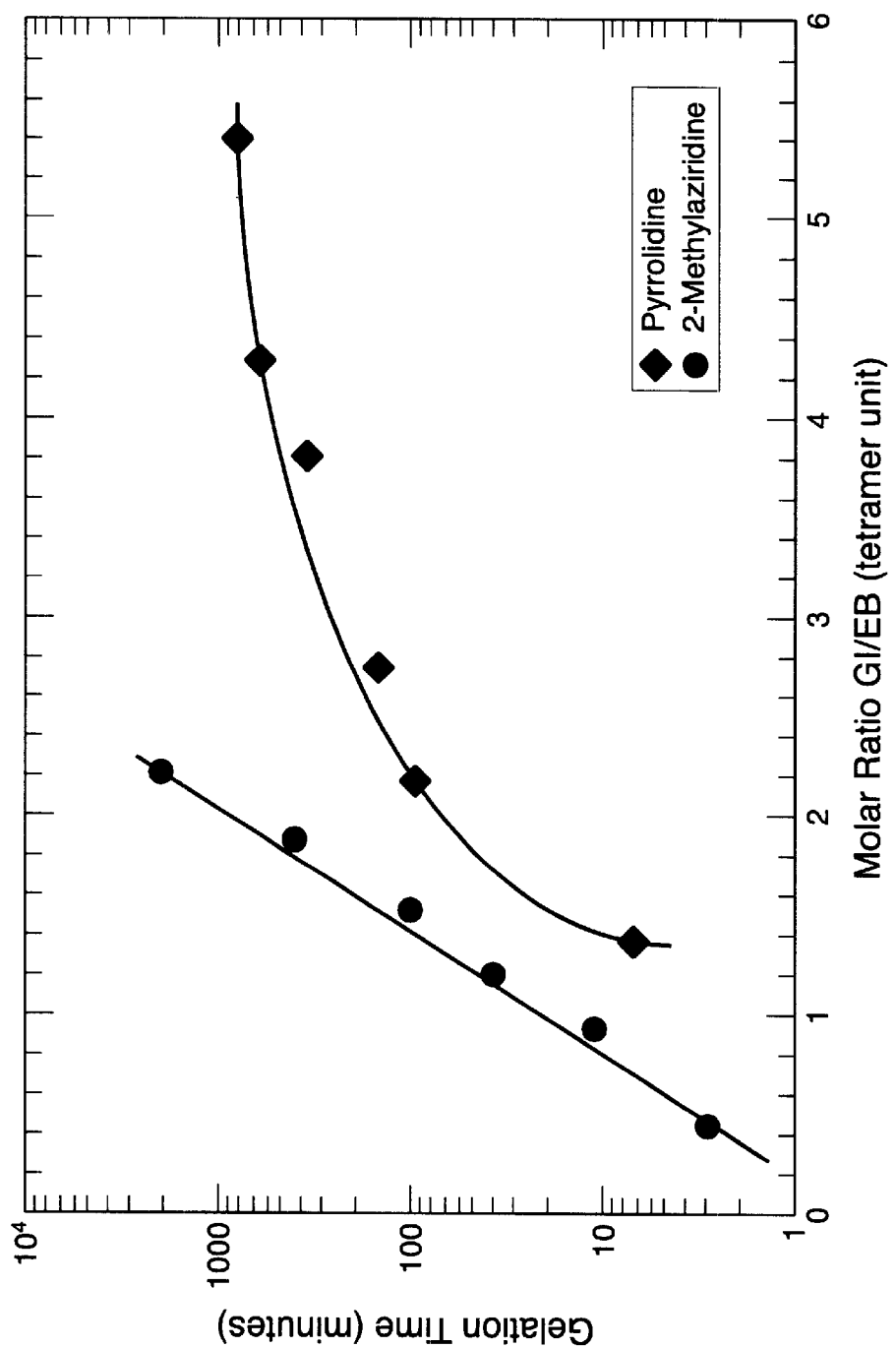
FIG. 3 is a graph of gelation time for a 20% w/w solution of high-molecular weight EB in NMP as a function of the molar ratio of GI to EB repeat unit for the secondary amines 2-methylazirdine and pyrrolidine GIs at 60° C., illustrating that higher GI/EB ratios generate longer gelation times.

FIG. 3 plots the data for gelation time for 20% w/w high-molecular weight EB solutions in NMP at 60° C. versus the molar ratio of gel-inhibitor to EB repeat unit (GI's are 2-methylaziridine (2MA) and pyrrolidine). It is clear that high GI/EB ratios lead to longer gelation times. For clarity, one such solution preparation is now described: 0.505 g of NMP and 79 mg of 2MA (90%, (1.25×10$^{-3}$ mole)) were mixed in a 10 ml PTFE screw-cap vial and heated at 60° C. for 5 min. Subsequently, 154 mg of polyaniline emeraldine base (4.3×10$^{-4}$ mole) was added to this solution (GI/EB= 2.90), stirred vigorously for several minutes, and then returned to the oven at 60° C. for 5 min. The vial was removed after each of nine, 5 min. time intervals, and vigorously stirred, until a homogeneous flowable liquid formed. The solution was then returned to the oven at 60° C. where it remained until it gelled.

The gelation time was monitored from the moment the homogeneous EB solution formed until the time when the solution would no longer flow which, for the EXAMPLES relating to secondary amines as gel inhibitors, occurred after the sample vial was tilted to an angle of 180° and the liquid no longer flowed to the bottom of the container. Each of the 2MA and pyrrolidine solutions plotted in FIG. 3 was prepared and analyzed in this fashion.

FIG. 3 shows that the different gel-inhibitors of the present invention have different effects on the gelation times, and that higher ratios of GI/EB tend to give longer times to gelation. Much longer gelation times occur if such studies are carried out at lower temperatures. For example, the EB/NMP/2MA solution described above gelled in 2.5 hr. at 60° C. When the same solution composition was prepared and stored in the refrigerator (~2° C.) for more than 48 hr., it remained a flowable gel-free liquid for this time interval.

Figure 4:
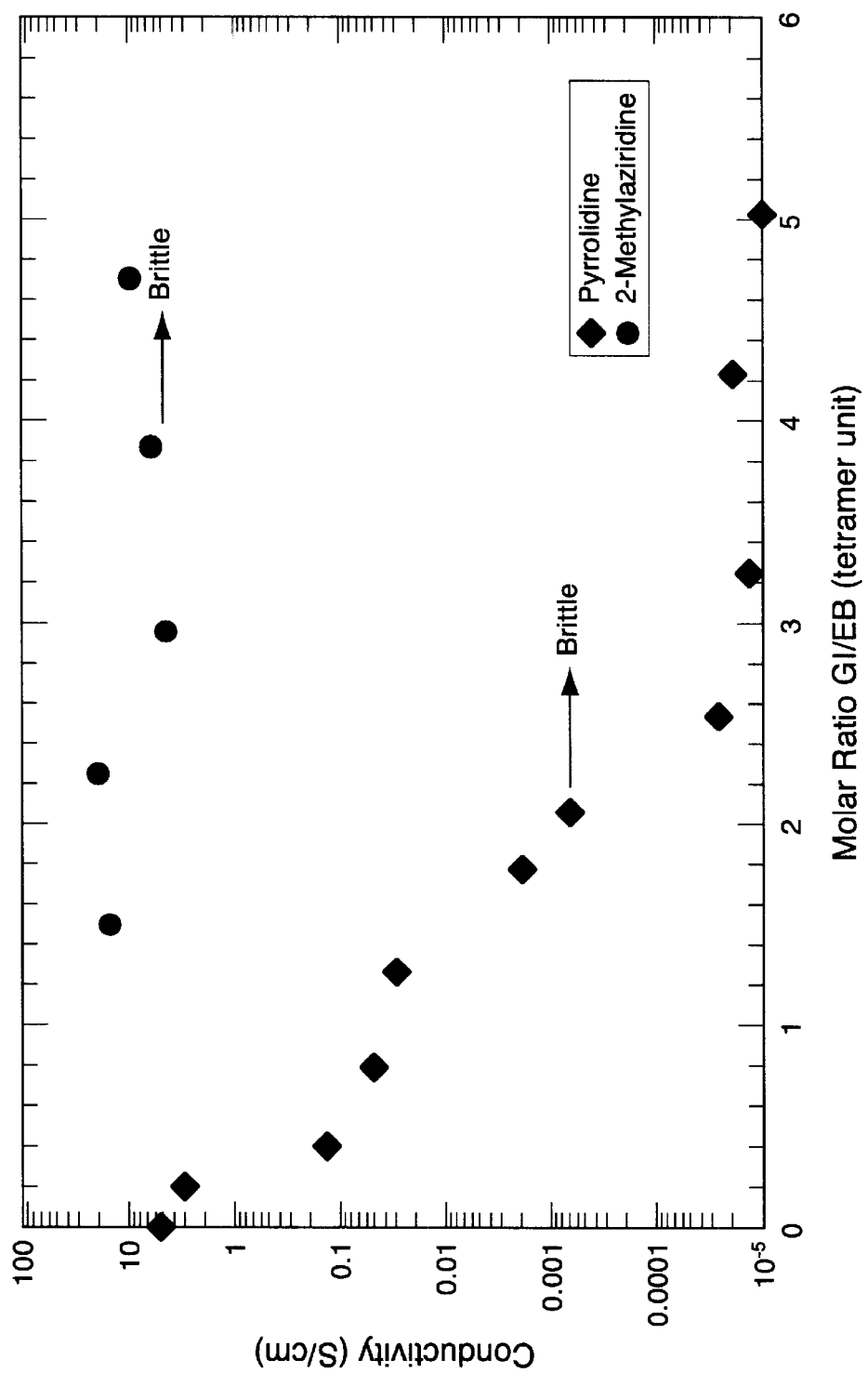
FIG. 4 is a graph of electrical conductivity as a function of the molar ratio of GI to EB repeat unit for 2-methylazirdine and pyrrolidine GIs at 20° C., illustrating that higher GI/EB ratios result in degradation of mechanical properties of resulting thermally annealed films and that certain GIs yield significantly reduced bulk electrical conductivities in such articles.

FIG. 4 is a plot of thermally annealed film conductivity results versus the molar ratio of gel-inhibitor to emeraldine base repeat unit (2MA and pyrrolidine) used to prepare samples in NMP, all at concentrations >20% EB w/w. The samples were prepared as described as above and the conductivities were measured at 20° C. by the four-point probe method (See Vander Pauw, supra). It is clear that at higher GI/EB ratios, reductions in thermally annealed film mechanical properties occur. Additionally, certain GI's of the present invention, e.g., pyrrolidine, exhibit substantially reduced bulk conductivities for films and coatings when compared with other GI's such as 2-methylaziridine at the same GI/EB ratios. FIG. 4 shows that increasing the GI/EB ratio can in some instances decrease conductivity and mechanical integrity for thermally annealed films and coatings, while in other cases, only mechanical properties are degraded.

EXAMPLE 8

A mixture of 1.022 g of 1-methyl-2-piperidone and 160 mg of 2MA (2.52×10$^{-3}$ mole) was heated at 80° C. for 15 min., after which 306 mg (8.45×10$^{-4}$ mole) of polyaniline emeraldine base (GI/EB=2.98) was rapidly added to this solution with vigorous stirring. The sample was returned to the oven at this temperature until the homogeneous flowable liquid solution formed. The solution was applied to the surface of a 4 in.×4 in. glass slide and then thermally annealed at 120° C. for 60 min. The resulting film was immersed in water, and after a few minutes, it delaminated from the glass surface. The film was mechanically drawn at 120° C. to 2.6 times its original length. The conductivity of the doped, unstretched film was 20.5 S/cm and the conductivity of the stretched film was 50.3 S/cm. This Example shows that films formed by the solutions of the present invention can be mechanically stretched to increase electronic mobility and increase conductivity.

In this and following Examples, the gelation time for concentrated, high- and low-molecular weight EB solutions was determined by measuring the viscosity of the solutions. Viscosity measurements were performed with a commercially available cone and plate viscometer. A predetermined amount of dried polyaniline emeraldine base powder was added to a teflon vial contained 3.5 ml of NMP/GI solution. After vigorously stirring this solution for a few minutes, the teflon vial was tightly sealed and heated in an oven at 60° C. for 15 min. to ensure a homogeneous, particle free solution. One half of one milliliter of this solution was then transferred into the sample cup of the viscometer. Viscosity measurements were taken with a constant shear rate of 0.8 sec$^{-1}$ under isothermal (25° C.) conditions.

The gelation time is defined by placing a tangent line to the viscosity curve, as a function of time, where viscosity begins to rapidly increase, and another tangent line through the region of the curve where the viscosity remains unchanged. The time (min.) location corresponding to the intersection of the two tangent lines is the gelation time.

Figure 5:
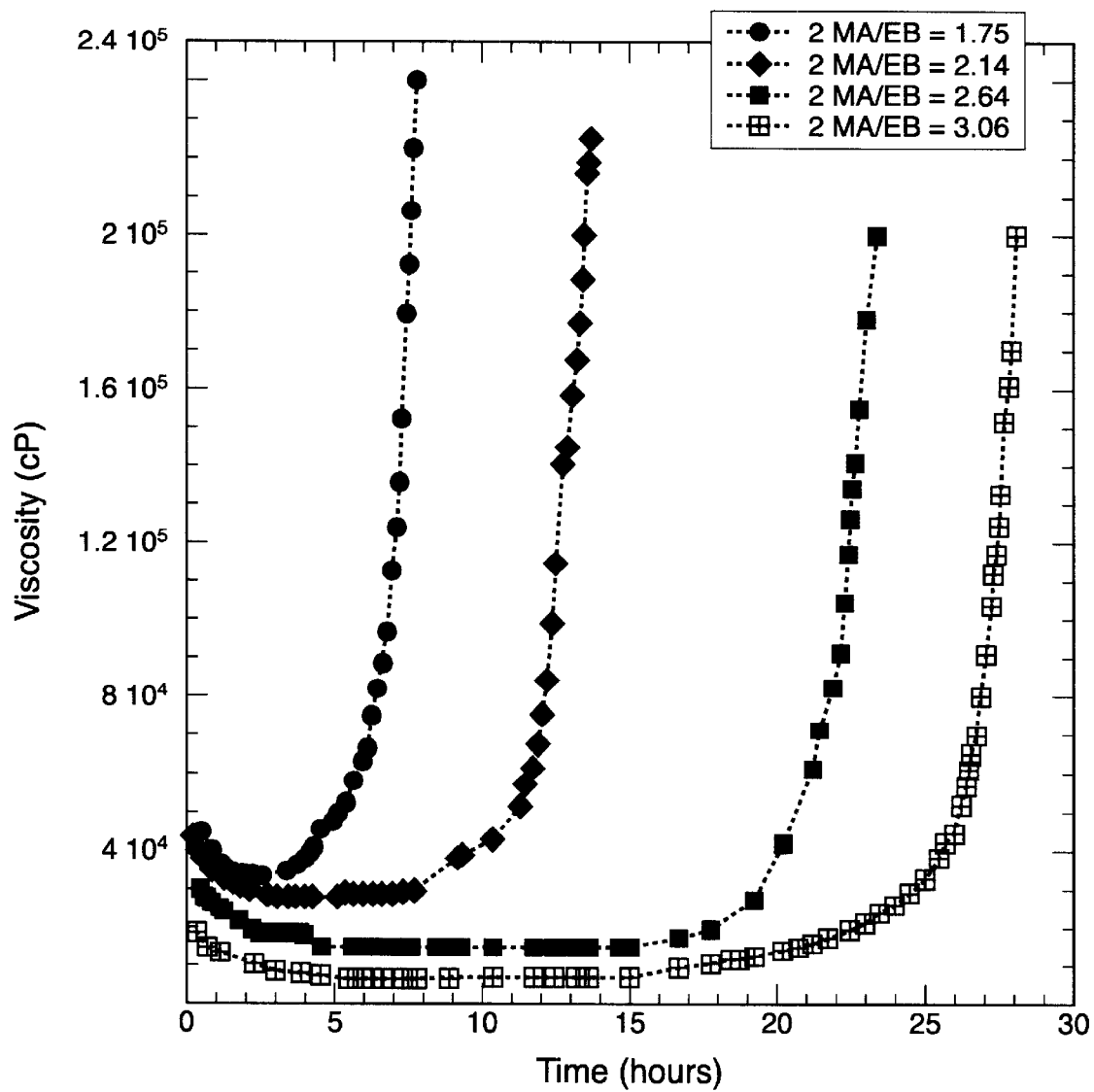
FIG. 5 is a graph of the viscosity of solutions of high-molecular weight polyaniline in NMP as a function of time for the secondary amine 2-methylazirdine as the GI at 60° C., for several molar ratios of GI to EB repeat unit and illustrates that higher GI/EB ratios permit longer time periods where the viscosity of the solution is low.

FIG. 5 is a graph of the viscosity of solutions of high-molecular weight polyaniline in NMP as a function of time for the secondary amine 2-methylazirdine as the GI at 60° C., for several molar ratios of GI to EB repeat unit and illustrates that higher GI/EB ratios permit longer time periods where the viscosity of the solution is low. Solution of the polyaniline occurs when the 2MA is added in near stoichiometric amounts (2MA/EB≈2), and heating or high-shear mixing is required. Generally, there appears to be three Theological regions. These regions are explained by the present inventors as follows: (1) initially, the viscosity decreases as a result of the simultaneous breaking of the intermolecular hydrogen bonds of the EB powder with the concurrent formation of the 2MA/EB-bond complex; (2) this region is followed by a period where there is no change in the viscosity of the system; that is, a stable equilibrium condition occurs where approximately two secondary amine additive molecules have complexed with the two imine nitrogens in the polymer repeat unit to form a stable complex through a hydrogen bond interaction; and (3) after a further period of time, the solution phase separates due to the prolonged effects of continuous shearing in the viscometer, giving rise to gelation of the reactive polymer mass. During this period, the intermolecular polymer hydrogen bonds are reestablished which leads to the cessation of fluidity as a three-dimensional, physically cross-linked network forms.

Figure 6:
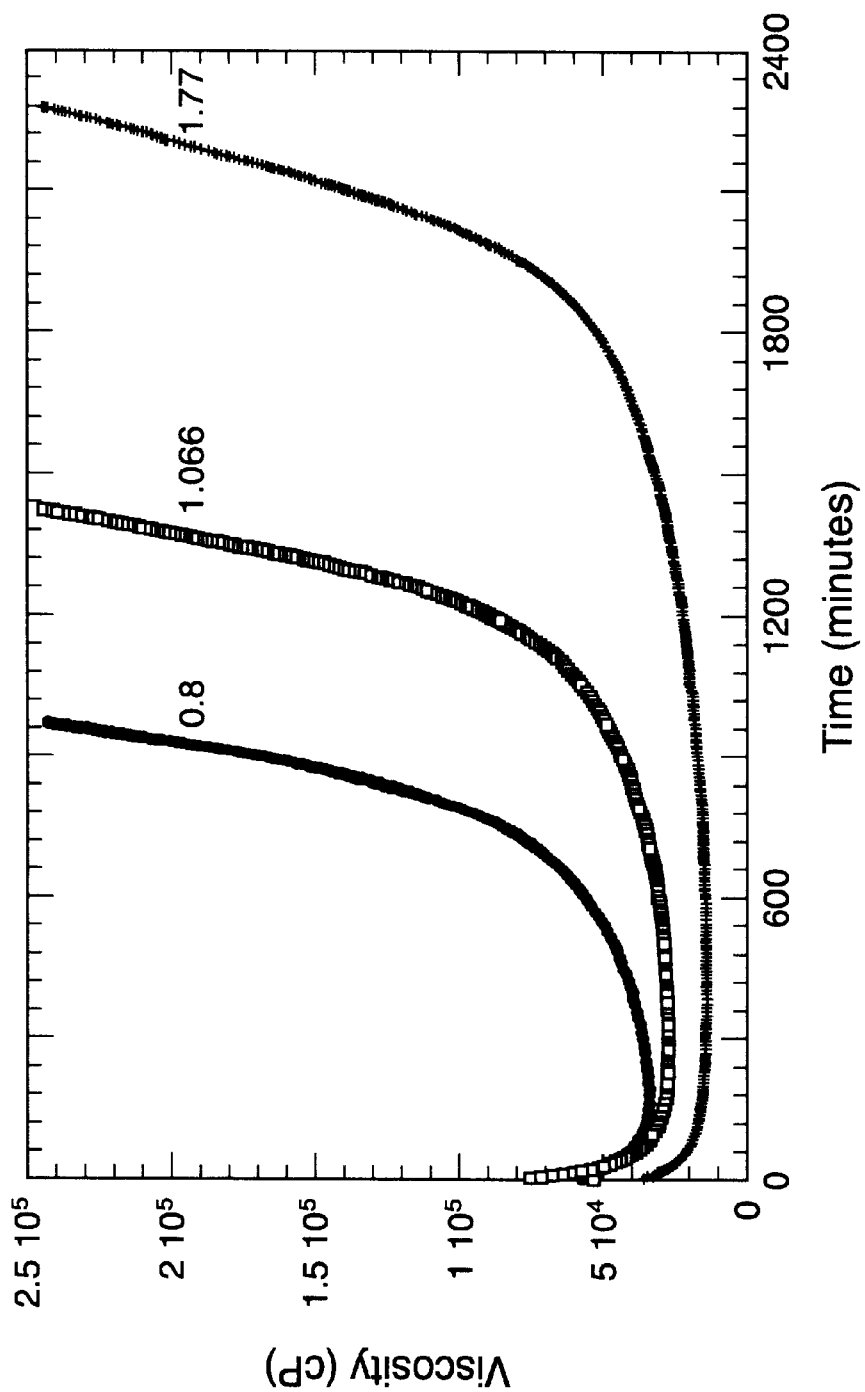
FIG. 6 is a graph of the viscosity as a function of time for a 20% w/w solution of high-molecular weight EB for several molar ratios of GI to EB repeat unit for the secondary amine heptamethyleneimine as the GI.

FIG. 6 is a graph of the viscosity as a function of time for a 20% w/w solution of high-molecular weight EB for several molar ratios of GI to EB repeat unit for the secondary amine heptamethyleneimine as the GI.

EXAMPLE 9

Primary amines, such as amylamine, cyclopropylamine, cyclobutylamine, n-butylamine, and cyclohexylamine, were used as gel inhibitors in HMW EB (−15° C. synthesis) and LMW EB (0° C. synthesis) solutions. Typically, when a primary amine was used, and the appropriate GI/EB molar ratio selected, >15% w/w HMW EB solutions can be generated. It is significantly easier to prepare >20% w/w EB/NMP/primary amine solutions using LMW EB. Gelation times for EB/NMP/primary amine solutions can be as long as one week when an appropriate amount of primary amine was mixed with the EB/NMP solution.

A solution of 1.072 g of NMP and 0.070 g of the primary amine, cyclopropylamine (1.22×10$^{-3}$ mole) was heated in an oven at 60° C. for ~20 min. Two hundred and twenty-nine mg of HMW EB (6.33×10$^{-4}$ mole) was added in this solution generating a solution having a GI/EB molar ratio of 1.93. After vigorously stirring for about 1 min., a homogeneous polyaniline solution was formed. The EB concentration was 16.7% w/w. The solution was next spread onto two glass slides, one of which was immersed in 15° C. water to produce a IP film. This film exhibited good mechanical properties. The second film was placed in an oven at 120° C. for 1 hr. and also exhibited good mechanical properties.

EXAMPLE 10

A solution of 1.040 g of NMP and 0.064 g ($8.75 \times 10^{-4}$ mole) of the primary amine, n-butylamine, was mixed in a 10 ml PTFE screw-cap vial, and heated at 60° C. for 5 min. Two hundred and thirty-three mg ($6.44 \times 10^{-4}$ mole) of HMW EB was added to this solution rendering GI/EB=1.36. The solution was vigorously stirred for several minutes, and returned to the oven at 60° C. until a homogeneous solution formed. The total EB concentration was 17.4% w/w. A dense film was produced by spreading the solution onto a glass plate which was then thermally annealed at 120° C. for approximately 2 hr. to remove the casting solution. A wet film was formed by spreading a portion of the solution onto a glass plate which was immediately immersed in a water bath, whereupon the polymer precipitated to form a film.

To a solution of 1.040 g of NMP and 64 mg of the primary amine, n-butylamine ($8.77 \times 10^{-4}$ moles) at 25° C. was added 260 mg of HMW EB ($7.18 \times 10^{31\ 4}$ moles) to make a 19.1% w/w solution having a GI/EB molar ratio of 1.22. This solution was observed to have a gelation time of 100 min. The examples presented in Table 5 contain HMW EB at between 19 and 21% w/w in NMP, and exhibit gelation times between 45 min. and 24 h with primary amine GIs. The conductivity of the thermally cured dense and porous films is also shown. Thermally cured dense films are observed to be flexible, while porous films are brittle.

EXAMPLE 11

Forty-three mg of HMW EB was added to 960 mg of the primary amine, cyclohexylamine to make a 4.3% w/w EB solution. The EB powder swelled in this solution and remained in particle form after heating in an oven at 60° C. oven for 10 min. This result indicates that cyclohexylamine by itself is not a solvent for HMW EB; rather it functions only as a GI when used with NMP to dissolve EB. Thus, cyclohexylamine is neither a solvent nor a cosolvent for HMW EB.

TABLE 5

| Solvent (NMP) (g) | Gel inhibitor (g) | Conductivity of the dense film (S/cm) | Conductivity of the IP film (S/cm) | Molar ratio of GI/EB |
|---|---|---|---|---|
| 1.072 | Cyclopropylamine 0.070 | $3.5 \times 10^{-5}$ (F) | 9.3 (B) | 2.05 |
| 1.040 | N-butylamine 0.064 | 0.7 (F) | 11.7 (B) | 1.22 |
| 1.038 | Cyclohexylamine 0.083 | $2.2 \times 10^{-2}$ (F) | 13.6 (B) | 1.29 |
| 1.030 | Cyclobutylamine 0.075 | $1.0 \times 10^{-4}$ (F) | 1.6 (B) | 1.49 |
| 1.040 | Amylamine 0.092 | $7.0 \times 10^{-2}$ (F) | 5.5 (B) | 1.84 |
| 1.030 | 2-amino-1-methoxypropane 0.090 | 13.7 (F) | 11.30 (B) | 1.23 |
| 1.027 | 4-aminomorpholine 0.120 | 0.78 (B) | 0.30 (B) | 1.40 |
| 1.029 | 1,2-diaminocyclohexane 0.108 | $7.20 \times 10^{-2}$ (F) | 11.03 (B) | 1.13 |
| 1.030 | 1,4-diaminobutane 0.094 | 1.90 (SB) | 7.66 (B) | 1.27 |
| 1.029 | 1-aminopiperidine 0.117 | $2.35 \times 10^{-2}$ (B) | 0.74 (B) | 1.41 |
| 1.002 | 1-aminohomopiperidine 0.122 | (VB) | 0.15 (B) | 1.29 |
| 1.030 | Tetrahydrofurfurylamine 0.117 | 4.7 (B) | 17.90 (B) | 1.42 |
| 1.018 | 1,2-diamino-2-methylpropane | 11.56 (F) | 13.30 (B) | 0.95 |

TABLE 5-continued

| Solvent (NMP) (g) | Gel inhibitor (g) | Conductivity of the dense film (S/cm) | Conductivity of the IP film (S/cm) | Molar ratio of GI/EB |
|---|---|---|---|---|
| | ![structure with NH2, NH2] | | | |

Thus, it is possible to prepare highly concentrated. HMW EB solutions using primary amines as GIs in solutions where NMP is the solvent. The conductivities of doped, thermally cured dense films prepared from these solutions is 0–4 orders of magnitude lower when compared to the conductivity of doped IP films prepared from the same solutions. This result is consistent with the observations for using secondary amines as GIs, where the conductivities of the thermally cured dense films are likewise found to be lower than those for the IP films.

EXAMPLE 12

Figure 7:
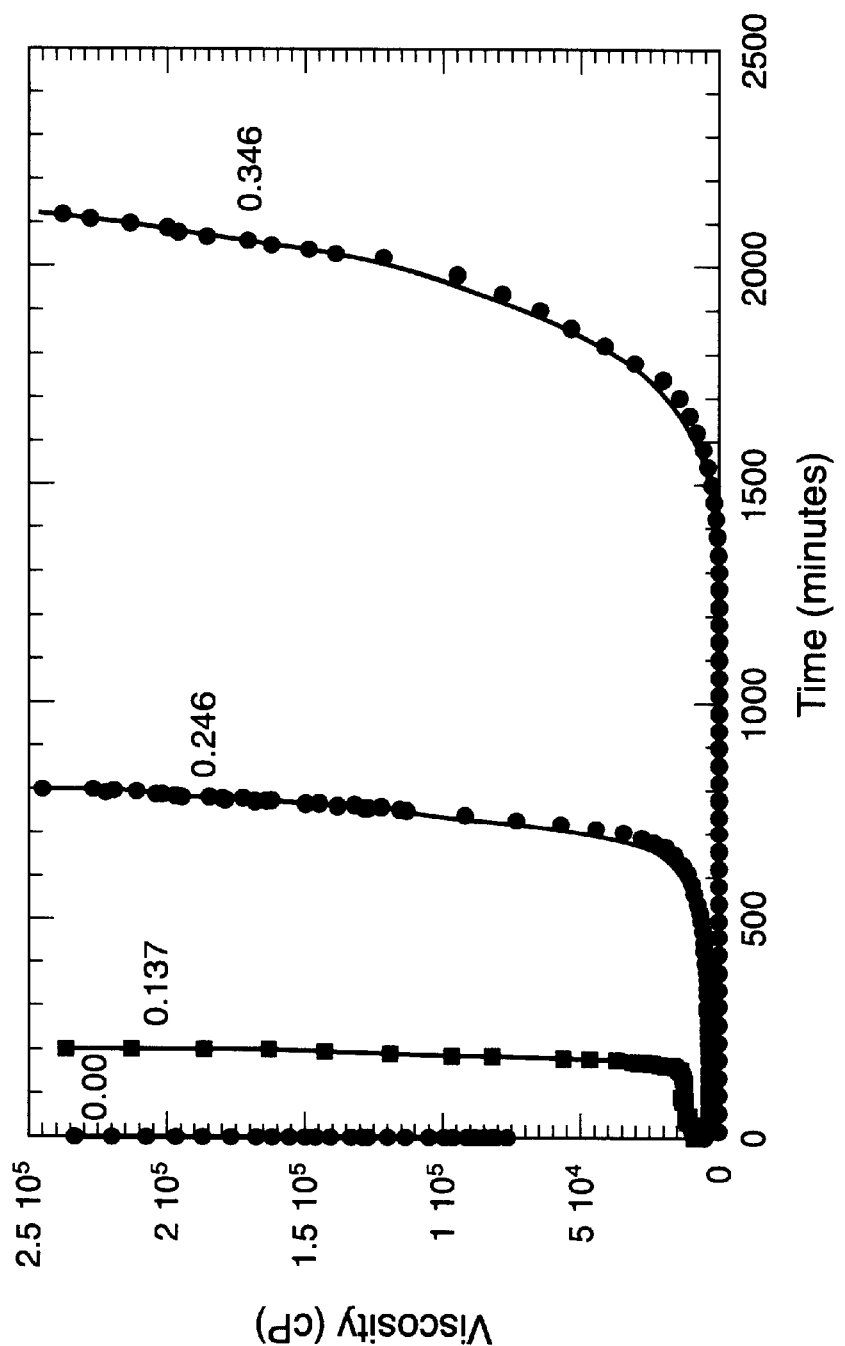
FIG. 7 is a graph of the viscosity as a function of time for a 20% w/w solution of low-molecular weight EB for several molar ratios of GI to EB repeat unit for the primary amine n-butyl amine as the GI.

FIG. 7 is a graph of the viscosity as a function of time for a 20% w/w solution of low-molecular weight EB for several molar ratios of GI to EB repeat unit for the primary amine n-butyl amine as the GI. For a solution of 1.032 g of NMP and 18.5 mg of the primary amine, n-butylamine (2.53×10−4 moles) at 25° C. to which 267 mg of LMW EB (7.37×10−4 moles) was added to make a 20.3 wt % solution with a GI/EB molar ratio of 0.34, the gelation time was estimated to be ~1700 min. from the data shown in FIG. 7.

To a solution mixture of 1.000 g of NMP and 0.025 g of 1,2-diamino-2-methylpropane (2.84×10$^{-4}$ moles), 260 mg of LMW EB (7.18×10$^{-4}$ moles) was added at room temperature (20° C.) to make a 20.3 wt % EB/NMP/1,2-diamino-2-methylpropane solution (GI/EB=0.396). The solution was vigorously stirred for about 2 min. until a homogeneous solution was formed. A dense film was produced by spreading the solution onto a glass plate. The film was thermally annealed at 120° C. for approximately 2 h to remove the casting solution. A second film (IP) film was formed by spreading a portion of the solution onto a glass plate which was immediately immersed into a water bath, whereupon the polymer precipitated to form a film.

Figure 8:
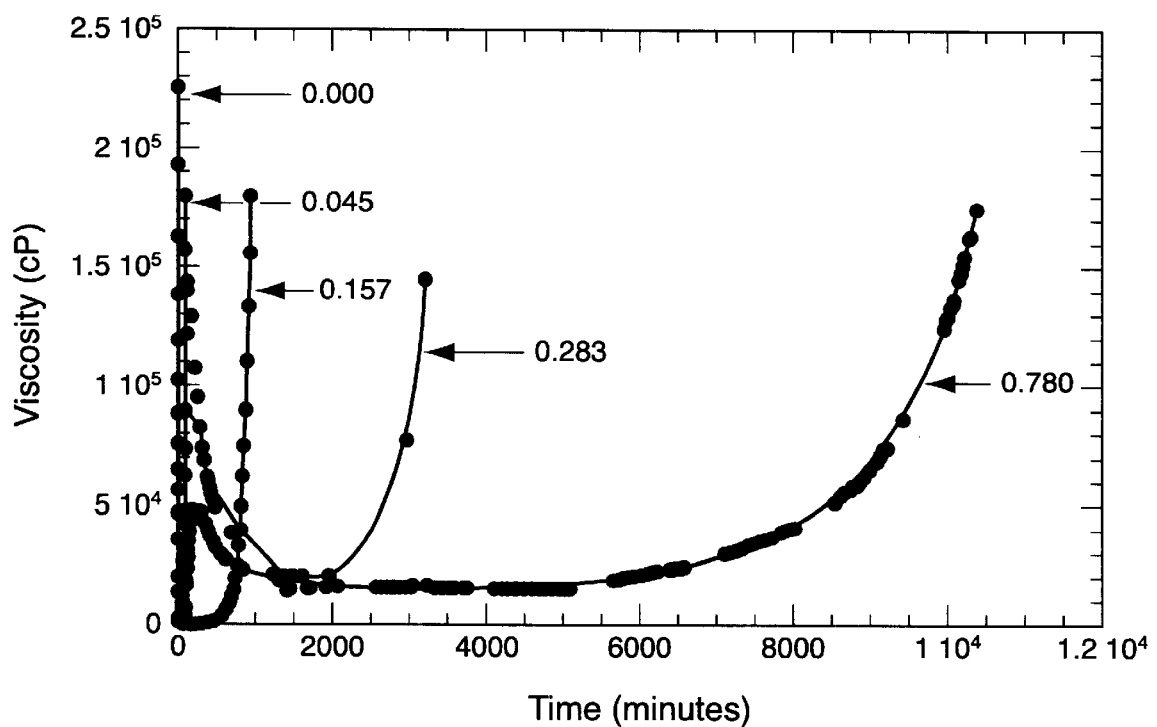
FIG. 8 is a graph of the viscosity as a function of time for a solution of low-molecular weight EB for several molar ratios of GI to EB repeat unit for the primary amine 1,2-diamino-2-methyl propane as the GI.
Figure 9:
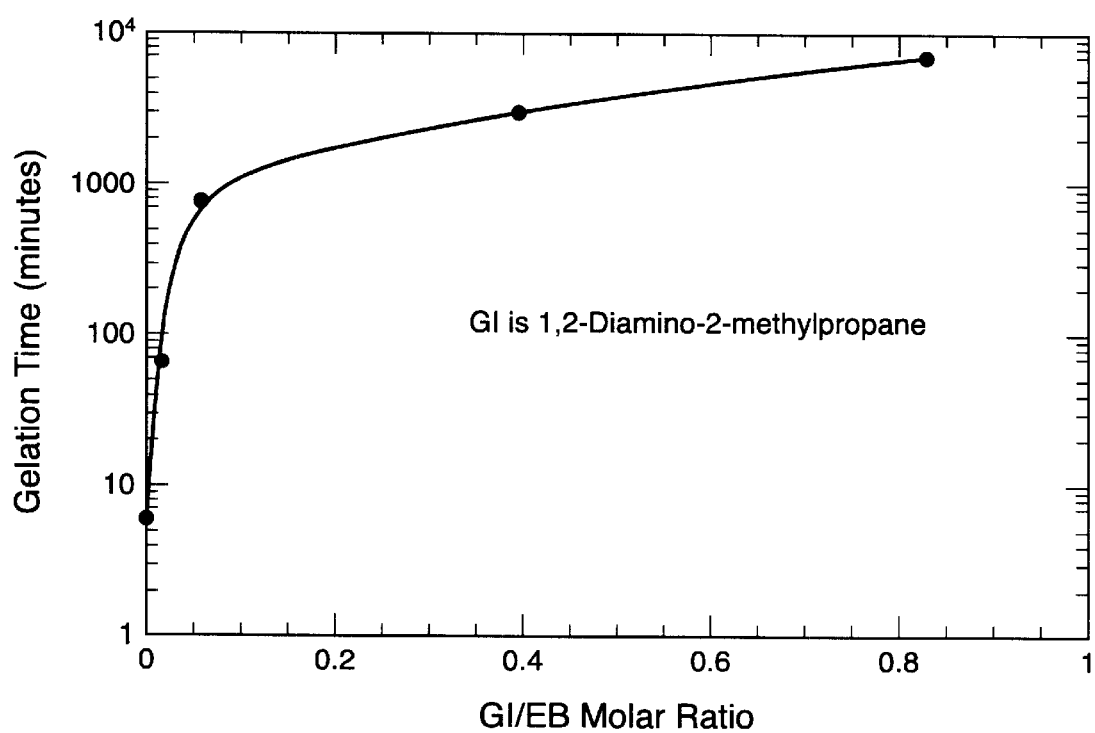
FIG. 9 is a graph of the gelation time for a solution of low-molecular weight EB as a function of the molar ratio of GI to EB repeat unit for the primary amine 1,2-diamino-2-methyl propane as the GI.

As shown in FIG. 8, the gelation time of EB/NMP/GI (1,2-diamino-2-methylpropane (a primary amine)) solution (~20 wt %) increases with increasing the GI/EB molar ratio. All solutions were prepared to have a polyaniline concentration in the range between 20.0–20.5 wt %. The solution having of 20% w/w EB/NMP (GI/EB=0.000) gelled within 6 min. Increasing the GI/EB molar ratio to 0.045, increases the gelation time to 70 min., a GI/EB molar ratio of 0.157 increases the gelation time to approximately 700 min., while a GI/EB molar ratio of 0.780 produces a gelation time of 9000 min. (6.25 days). A plot of gelation time of EB/NMP/GI (1,2-diamino-2-methylpropane) vs. GI/EB molar ratio is shown in FIG. 9.

Figure 10:
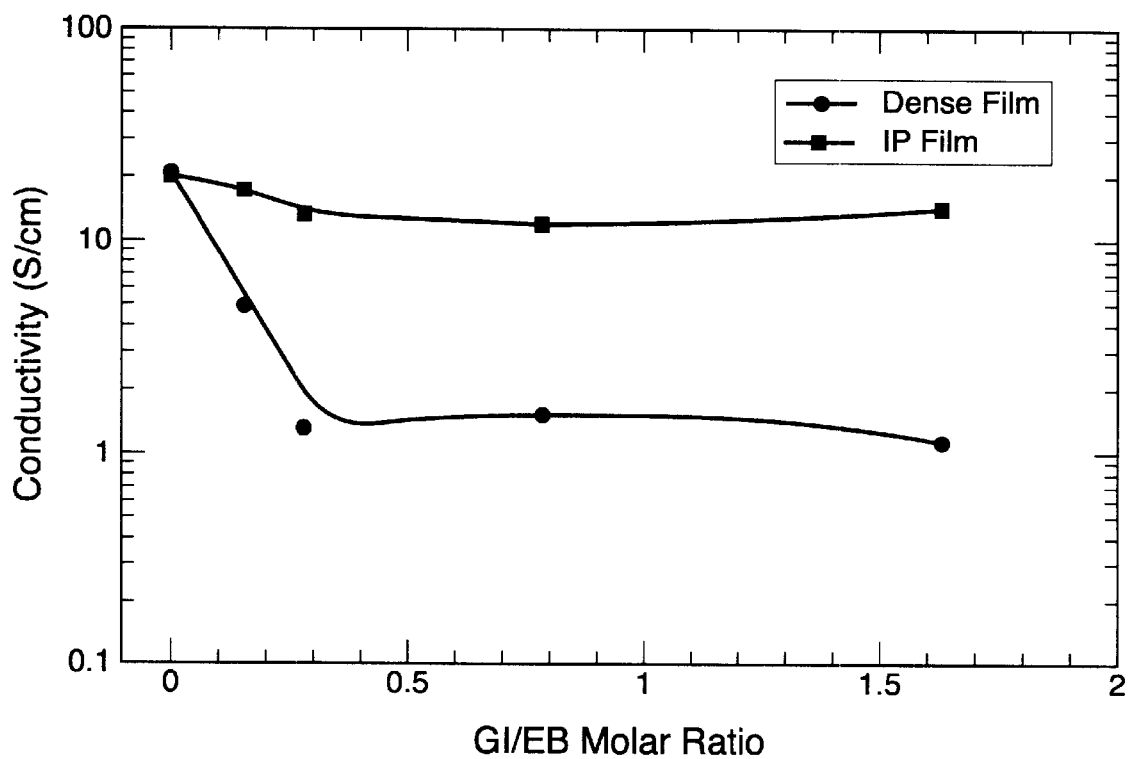
FIG. 10 is a graph of the electrical conductivity of dense and immersion precipitation (IP) films as a function of GI/EB molar ratio where the GI is the primary amine, 1,2-diamino-2-methylpropane, and the solvent is NMP.

Table 6 shows the results from NMP solutions containing variable amounts of GI to EB and the subsequent effects on the conductivities (σ=S/cm) and mechanical integrity of the thermally annealed films. It is clear from Table 6 that the thermally annealed dense films are more sensitive in conductivity property to the mixing stoichiometry of the gel inhibitor relative to the EB repeat unit; that is, thermally annealed dense films prepared from solutions without a gel inhibitor has a conductivity of 20.9 S/cm. Introducing 1,2-diamino-2-methylpropane into the solution as a gel inhibitor with a GI/EB molar ratio of 0.396, the conductivity of the doped dense film becomes 1.3 S/cm. Conductivity of doped dense films prepared without a GI are approximately 16 times higher than those for doped dense films prepared from solutions having a GI/EB molar ratio of 0.396. There appears to be little effect on the mechanical properties of the doped dense film when the value of GI/EB is less than 2. Varying the GI/EB molar ratio in the NMP show little effect on the conductivity of the immersed precipitated (IP) films. It is possible that this effect is due to the tendency of the GI to exchange with water during immersion process which lessens degradation caused by primary amines reducing the EB. Some degradation in conductivity is expected to occur for thermally annealed films. FIG. 10 is a graph of the conductivity of dense and immersion precipitation films as a function of GI/EB molar ratio where the GI is the primary amine, 1,2-diamino-2-methylpropane, and the solvent is NMP, the data points being taken from Table 6.

TABLE 6

| Gel inhibitor | Molar ratio of GI/EB | Conductivity of the dense film (S/cm) | Conductivity of the porous film (S/cm) |
|---|---|---|---|
| 1,2-diamino-2-methylpropane | 0.000 | 20.9 (F) | 20.5 (B) |
| 1,2-diamino-2-methylpropane | 0.157 | 4.9 (F) | 17.5 (B) |
| 1,2-diamino-2-methylpropane | 0.396 | 1.3 (F) | 13.3 (B) |
| 1,2-diamino-2-methylpropane | 0.780 | 1.5 (F) | 12.1 (B) |
| 1,2-diamino-2-methylpropane | 1.634 | 1.1 (F) | 14.1 (B) |

EXAMPLE 13

To 800 mg of 1,2-diamino-2-methylpropane, 200 mg of LMW EB was added at room temperature (~20° C.) to produce a 20% w/w EB solution. After vigorously stirring for 2 min., most of the LMW EB remained as particulates. Ten minutes later, the solubility had not improved. The solution was then placed in an oven at 60° C. for 10 min. and subsequently allowed to remain at room temperature overnight. No change in solubility was observed. Thus, it is not possible to prepare 20% w/w LMW EB solutions using 1,2-diamino-2-methylpropane as a solvent. Table 7 shows the properties of films made from LMW EB dissolved in NMP (≧20% w/w) with the assistance of primary amines.

TABLE 7

| Solvent (NMP) (g) | Gel inhibitor (g) | Conductivity of the dense film (S/cm) | Conductivity of the IP film (S/cm) | Molar ratio of GI/EB |
|---|---|---|---|---|
| 0.502 | — | 20.9 (F) | 20.51 (B) | 0 |
| 0.368 | N-butylamine 0.032 | 4.5 (F) | 8.01 (B) | 1.51 |
| | 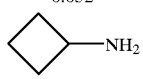 | | | |

TABLE 7-continued

| Solvent (NMP) (g) | Gel inhibitor (g) | Conductivity of the dense film (S/cm) | Conductivity of the IP film (S/cm) | Molar ratio of GI/EB |
|---|---|---|---|---|
| 0.370 | Cyclohexylamine 0.025 | 3.23 (F) | 5.1 (B) | 0.76 |
| 0.375 | t-amylamin 0.026 | 17.0 (F) | 15.9 (B) | 1.06 |
| 0.385 | Amylamine 0.016 | 3.45 (F) | 9.8 (B) | 0.66 |
| 0.375 | (±)-exo-2-aminonorbornane 0.035 | 1.95 (F) | 8.5 (B) | 1.09 |
| 0.372 | 1,2-diaminopropane 0.032 | 0.97 (F) | 4.43 (B) | 1.55 |
| 0.368 | Cyclooctylamine 0.034 | 2.03 (F) | 9.6 (B) | 0.94 |
| 0.372 | 1,2-diaminocyclohexane 0.030 | 0.0243 (B) | 5.57 (B) | 0.80 |
| 0.349 | 1-methyl-4-(methylamino) piperidine 0.051 | 8.82 (F) | 8.39 (B) | 1.37 |
| 0.365 | 4-(2-aminoethyl)morpholine 0.044 | 8.1 × 10$^{-3}$ (VB) | 12.73 (B) | 1.17 |
| 0.368 | Furfurylamine 0.051 | 1.5 × 10$^{-4}$ (VB) | 9.73 (B) | 1.77 |
| 0.608 | 1,2-diamino-2-methylpropane 0.030 | 1.5 (F) | 12.1 (B) | 0.79 |

From Table 6 and Table 7, it is apparent that 20% w/w EB/NMP/primary amine solutions can be prepared with good gelation times. The conductivies of the doped thermally cured dense films can be significantly lower than for the doped IP films. Certain gel inhibitors appear to cause degradation of the conductivity thermally cured dense films; however, other gel inhibitors have little or no effect on the physical properties of the thermally cured dense films. Changing the GI/EB molar ratio may alter the physical properties in the final film.

Thus, the following twenty primary amines have been identified as useful gel inhibitors for preparing highly concentrated (>15% w/w) HMW EB and (>20% w/w) LMW EB solutions: cyclopropylamine, n-butylamine, cyclobutylamine, cyclohexylamine, amylamine, t-amylamine, 2-amino-1-methoxypropane, 4-aminomorpholine, (+)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperidine, 4-(2-aminoethyl)morpholine. These concentrated solutions have been prepared using the 22 solvents identified hereinabove.

EXAMPLE 14

Tertiary amines have been utilized as GIs for low-molecular weight polyaniline emeraldine base (LMW EB). One hundred and thirty-one milligrams (1.32×10$^{-3}$ moles) of n-methylpiperidine, a tertiary amine, was added to 1.01 g of NMP and the solution mixture was heated in an oven at 60° C. for about 10 min. Three hundred and five milligrams of LMW polyaniline (8.43×10$^{-4}$ moles) was added to the solution of the GI, giving a GI/EB molar ratio of 1.57. After vigorously stirring for a minute, a homogeneous polyaniline solution was formed, the EB concentration in the solution being 21.1%. The solution was then spread onto two glass slides, one of which was immersed into 15° C. water to make a IP film. The IP film exhibited good mechanical properties; that is, it was strong and flexible. The gelation time for this solution was ~120 min.

EXAMPLE 15

To a solution of 1.031 g of NMP and 0.143 g (1.00×10$^{-3}$ mole) of tripropylamine, a tertiary amine, which was mixed in room temperature (20° C.), 309 mg (8.54×10$^{-4}$ mole) of low molecular weight (LMW) EB was added, and the resulting solution was stirred. The final concentration of EB is 20.9% w/w. A homogeneous solution resulted in a few minutes. The GI/EB molar ratio was 1.17. A dense film was produced by spreading the solution onto a glass plate. The film was then thermally annealed at 120° C. for approximately 2 hr. to remove the casting solution. A second wet film was formed by spreading a portion of the solution onto a glass plate and immediately immersing the plate into a water bath, whereupon the polymer precipitated to form a film. Both films were found to be flexible before acid doping. Table 8 identifies several tertiary amine GIs which, when used with NMP as the solvent, are effective in dissolving high concentrations (>20% w/w) of LMW EB.

TABLE 8

| Solvent (NMP) (g) | Gel inhibitor (g) | Conductivity of the dense film (S/cm) | Conductivity of the IP film (S/cm) | Molar ratio of GI/EB |
|---|---|---|---|---|
| 1.149 | — | 26.7 (F) | 20.51 (B) | 0 |
| 1.009 | N-methylpyrrolidine 0.075 | 32.0 (F) | 7.6 (B) | 0.96 |
| 1.010 | N-methylpiperidine 0.130 | 22.6 (F) | 5.7 (B) | 1.55 |
| 1.031 | Tripropylamine 0.143 | 26.4 (F) | 14.0 (B) | 1.17 |
| 1.035 | N-ethylmorpholine 0.202 | 12.0 (F) | 15.3 (B) | 2.06 |
| 1.035 | 1,3,5-triethylhexahydro-s-triazine 0.132 | 18.2 (F) | 20.2 (B) | 0.91 |
| 1.108 | 1,8-diazabicyclo[5,4,0]undec-7-ene 0.193 | 26.8 (F) | 7.5 (B) | 1.49 |
| 1.051 | N,N-dimethylbenzylamine 0.139 | 33.3 (F) | 14.4 (B) | 1.22 |
| 1.022 | N-ethylypiperidine 0.124 | 26.92 (F) | 7.40 (B) | 1.35 |

TABLE 8-continued

| Solvent (NMP) (g) | Gel inhibitor (g) | Conductivity of the dense film (S/cm) | Conductivity of the IP film (S/cm) | Molar ratio of GI/EB |
|---|---|---|---|---|

The tertiary amines: 1,4-dimethylpiperazine and triethylamine have also been found to be suitable gel inhibitors.

EXAMPLE 16

Figure 11:
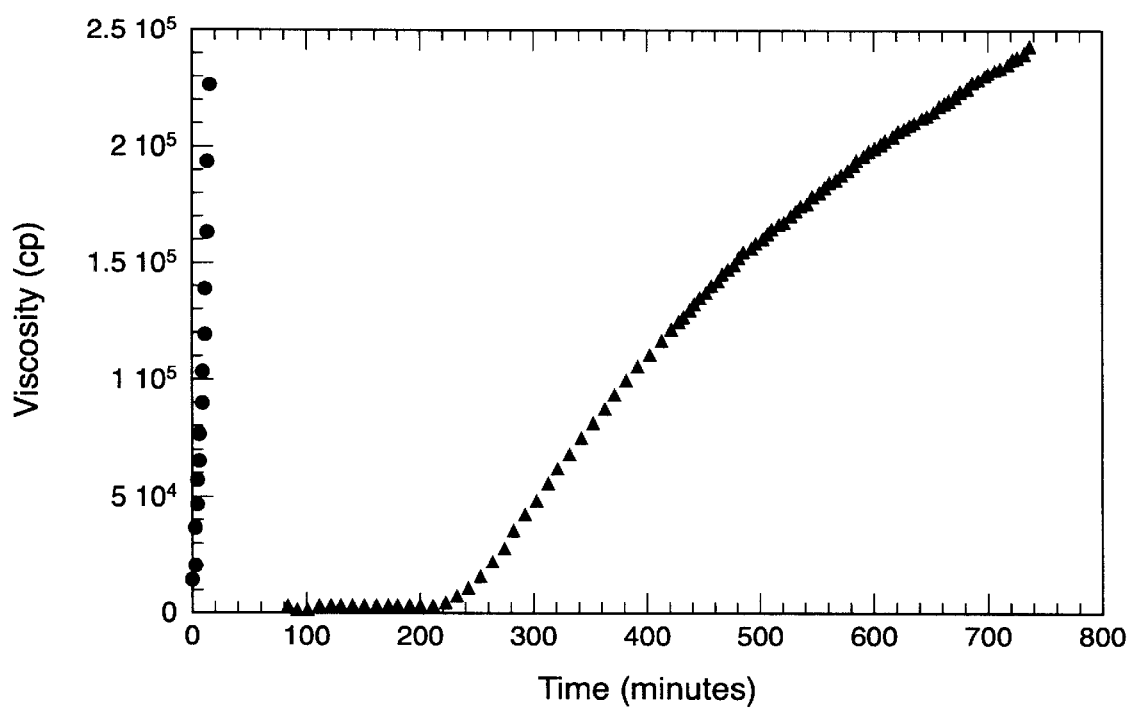
FIG. 11 is a graph of viscosity versus time for two low-molecular weight (LMW) EB solutions at 25° C., the curve denoted by filled circles representing a solution of EB in NMP without a GI (which gelled in 6 min.), while the curve denoted by filled triangles represents the situation where n-methylpyrrolidine, a tertiary amine, was mixed with the NMP with a GI/EB=0.8 in the preparation of a 20% w/w solution of the LMW EB, the solution having a gelation time of 220 min.
Figure 12:
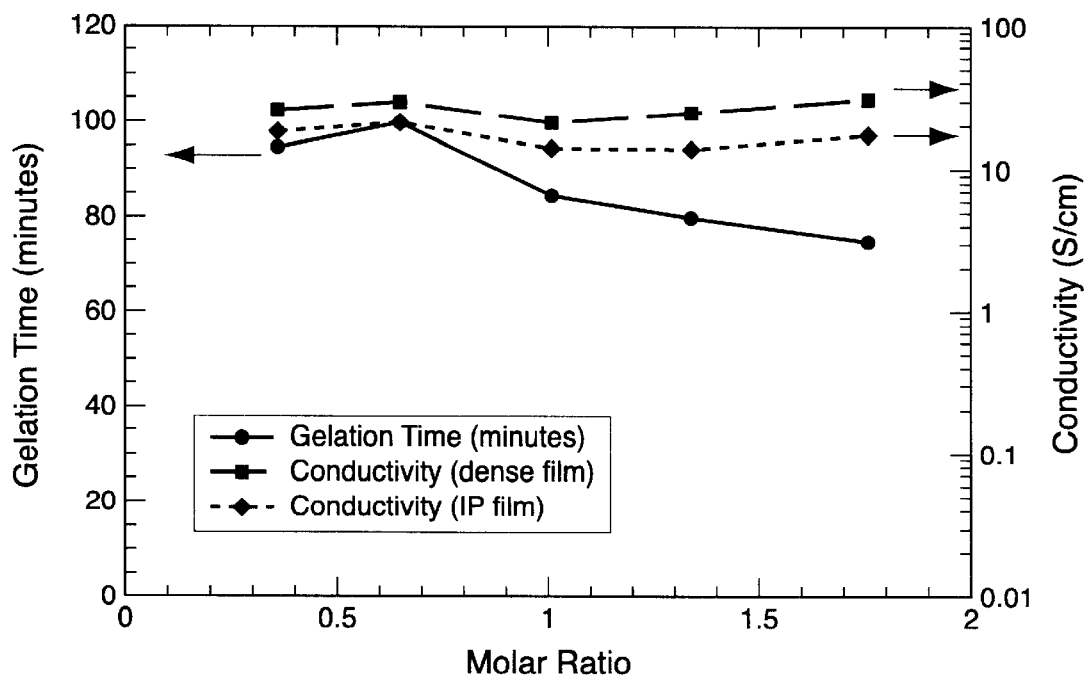
FIG. 12 is a graph of the gelation time as a function of GI/EB molar ratio where tripropylamine, a tertiary amine, was used as the GI in the preparation of 20% w/w LMW EB in NMP solutions, and shows that no significant change in gelation time occurs for molar ratios between 0.7 and 1.7 (gelation times vary from 70 min. to 100 min.).

The gelation time for highly concentrated (20% w/w) LMW EB/NMP/tertiary amine solutions was described hereinabove. FIG. 11 is a graph of viscosity versus time for two LMW EB solutions in NMP at 25° C. The curve denoted by filled circles represents a solution prepared without using a GI, which gelled in 6 min. When n-methylpyrrolidine, a tertiary amine, was mixed with the NMP with a GI/EB=0.8 in the preparation of a 20% w/w solution of LMW EB, the solution had a gelation time of 220 min. (solid triangles). Other tertiary amines, such as tripropylamine, were used as gel inhibitors to process LMW EB in NMP. FIG. 12 illustrates the gelation time as a function of GI/EB molar ratio for 20% w/w LMW EB/NMP/tripropylamine solutions, and shows no significant change in gelation time for this particular gel inhibitor (gelation times vary from 70 min. to 100 min. for molar ratios between 0.3 to 1.7). The gelation times when tertiary amines are used as gel inhibitors are generally significantly longer than that for the 20% EB/NMP solution prepared without using a GI (6 mm.). When n-methylpiperidine was used as the GI in a 20% w/w LMW EB/NMP/n-methylpiperidine solution having a GI/EB molar ratio of 1.55, the gelation time was found to be 120 min. There is no deterioration of conductivity and mechanical properties of the thermally cured dense films and immersed precipitated (IP) films when prepared using tertiary amines as gel-inhibitors in EB/NMP solutions.

EXAMPLE 17

Twenty milligrams of LMW EB was added 80 mg of n-methylpyrrolidine, a tertiary amine, to make a 20% w/w EB solution; the majority of the EB powder remained undissolved (in particle form) after being heating in an oven at 60° C. for 10 min. This EXAMPLE demonstrates that n-methylpyrrolidine itself is not a solvent for LMW EB and it functions only as a GI when used with a solvent such as NMP to enable preparation of EB solutions having >20% w/w of LMW EB (EB/NMP/GI). Thus, tertiary amines are neither solvents nor cosolvents for LMW EB.

In conclusion, primary, secondary and tertiary amines can all be use as gel inhibitors incorporating with solvents such as NMP to make concentrated polyaniline solutions. Use of primary and secondary amines may cause degradation in the conductivity of thermally cured dense films, while use of tertiary amines has not produced degradation of conductivity of such films.

Primary, secondary and tertiary amines have little effect on the conductivity of immersed precipitation films.

All amines show limited solubility for EB and are not consolvents, a few examples, such as 3-pyrrolidinol have good solubility for EB but gelation times are short.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing solutions having between 15% and 40% by weight of $(M_w) \geq 120,000$, $(M_n) \geq 30,000$ emeraldine base form of polyaniline, which comprises the steps of:
   a. mixing a solvent for polyaniline with a mixture of a primary amine and a secondary amine such that the molar ratio of the primary amine and secondary amine to polyaniline tetramer repeat unit is between 0.1 and 5.0, forming thereby a solution; and
   b. dissolving polyaniline having $(M_w) \geq 120,000$ and $(M_n) \geq 30,000$ in the solution thus prepared, whereby a solution is formed which is stable over a chosen time period.

2. The method for, preparing solutions having between 15% and 40% by weight of $(M_w) \geq 120,000$, $(M_n) \geq 30,000$ emeraldine base form of polyaniline as described in claim 1, wherein the molar ratio of primary amine and secondary amine to polyaniline tetramer repeat unit is between 1 and 2.

3. The method for preparing solutions having between 15% and 40% by weight of $(M_w) \geq 120,000$, $(M_n) \geq 30,000$ emeraldine base form of polyaniline as described in claim 1, wherein the solvent is selected from the group consisting of n-methyl-2-pyrrolidinone, n-ethyl-2-pyrrolidinone, 1-cyclohexyl-2-pyrrolidinone, 1-methyl-2-piperidone, n-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 4-acetylmorpholine, 1-acetyl-3-methylpiperidine, n,n-dimethylpropionamide, N,N,N',N'-tetramethyurea, N,N-dimethylacetamide, dimethylsulfoxide, tetramethylene sulfoxide, hexamethylphosphoramide, δ-valerolactam, N,N-2-trimethylpropionamide, and mixtures thereof.

4. The method for preparing solutions having between 15% and 40% by weight of $(M_w) \geq 120,000$, $(M_n) \geq 30,000$ emeraldine base form of polyaniline as described in claim 1, wherein the secondary amine is selected from the group consisting of: 2-methylaziridine, azetidine, pyrrolidine, piperidine, hexamethyleneimine, heptamethyleneimine, 3-pyrroline, 3-pyrrolidinol, (R)-(-)-pyrrolidine-2-methanol, (S)-(+)-pyrrolidine-2-methanol, 4-ethyl-2-methyl-(3-methylbutyl)oxazolidine, (S)-(+)-(anilinomethyl) pyrrolidine, 1,3,3-trimethyl-6-azabicyclo[3,2,1]octane, (S)-(+)-(methoxymethyl)pyrrolidine, indoline, thiomorpholine, decahydroquinoline, 2,6-dimethylmorpholine, diethylamine, dicyclohexylamine, dipropylamine, dibutylamine, N-methylhexylamine, 1-aza-15-crown-5, 1,2, 3,6-tetrahydropyridine, 1,4,5,6-tetrahydropyrimidine, 1,4-dioxa-8-azaspiro[4.5]-decane, 3,3-dimethylpiperidine, morpholine, and 3,5-dimethylpiperidine, and mixtures thereof.

5. The method for preparing solutions having between 15% and 40% by weight of $(M_w) \geq 120,000$, $(M_n) \geq 30,000$ emeraldine base form of polyaniline as described in claim 1, wherein the primary amine is selected from the group consisting of: cyclopropylamine, n-butylamine, cyclobutylamine, cyclohexylamine, amylamine, t-amylamine, 2-amino-1-methoxypropane, 4-aminomorpholine, (±)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperidine, 4-(2-aminoethyl)morpholine, and mixtures thereof.

6. A method for preparing solutions having 15%–40% by weight of $(M_w) \geq 120,000$, $(M_n) \geq 30,000$ emeraldine base form of polyaniline, which comprises the steps of:
   a. mixing a solvent for polyaniline with a primary amine such that the molar ratio of the primary amine to polyaniline tetramer repeat unit is between 0.1 and 5.0, forming thereby a solution; and
   b. dissolving polyaniline having $(M_w) \geq 120,000$ and $(M_n) \geq 30,000$ in the solution thus prepared, whereby a solution is formed which is stable over a chosen time period.

7. The method for preparing solutions having between 15% and 40% by weight of $(M_w) \geq 120,000$, $(M_n) \geq 30,000$ emeraldine base form of polyaniline as described in claim 6, wherein the molar ratio of primary amine to polyaniline tetramer repeat unit is between 1 and 2.

8. The method for preparing solutions having between 15% and 40% by weight of $(M_w) \geq 120,000$, $(M_n) \geq 30,000$ emeraldine base form of polyaniline as described in claim 6, wherein the solvent is selected from the group consisting of N-methyl-2-pyrrolidinone, N-ethyl-2-pyrrolidinone, 1-cyclohexyl-2-pyrrolidinone, 1-methyl-2-piperidone, N-methylcaprolactam, 1,5-dimethyl-2-pyrrolidinone 2pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 4-acetylmorpholine, 1-acetyl-3-methylpiperidine, N,N-dimethylpropionamide, N,N,N',N'-tetramethyurea, N,N-dimethylacetamide, dimethylsulfoxide, tetrametylene sulfoxide, hexamethylphosphoramide, δ-valerolactam, N,N-2-trimethylpropionamide, and mixtures thereof.

9. The method for preparing solutions having between 15% and 40% by weight of $(M_w) \geq 120,000$, $(M_n) \geq 30,000$ emeraldine base form of polyaniline as described in claim 6, wherein the primary amine is selected from the group consisting of: cyclopropylamine, n-butylamine, cyclobutylamine, cyclohexylamine, amylamine, t-amylamine, 2-amino-1-methoxypropane, 4-aminomorpholine, (±)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperidine, 4-(2-aminoethyl)morpholine, and mixtures thereof.

10. A method for preparing solutions having >20% by weight of $(M_w) < 120,000$, $(M_n) < 30,000$ emeraldine base form of polyaniline, which comprises the steps of:
   a. mixing a solvent for polyaniline with an amine such that the molar ratio of the amine to polyaniline tetramer repeat unit is between 0.1 and 5.0, forming thereby a solution; and
   b. dissolving polyaniline having $(M_w) < 120,000$, $(M_n) < 25,000$ in the solution thus prepared, whereby a solution is formed which is stable over a chosen time period.

11. The method for preparing solutions having >20% by weight of $(M_w) < 120,000$, $(M_n) < 30,000$ emeraldine base form of polyaniline as described in claim 10, wherein the molar ratio of the amine to polyaniline tetramer repeat unit is between 1 and 2.

12. The method for preparing solutions having >20% by weight of $(M_w)$<120,000, $(M_n)$<30,000 emeraldine base form of polyaniline as described in claim 10, wherein the solvent is selected from the group consisting of N-methyl-2-pyrrolidinone, N-ethyl-2-pyrrolidinone, 1-cyclohexyl-2-pyrrolidinone, 1-methyl-2piperidone, N-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 1-acetylpiperazine 4-acetylmorpholine, 1-acetyl-3-methylpiperidine, N,N-dimethylpropionamide, N,N,N',N'-tetramethyurea, N,N-dimethylacetamide, dimethylsulfoxide, tetrametylene sulfoxide, hexamethylphosphoramide, δ-valerolactam, N,N-2-trimethylpropionamide, and mixtures thereof.

13. The method for preparing solutions having >20% by weight of $(M_w)$<120,000, $(M_n)$<30,000 emeraldine base form of polyaniline as described in claim 10, wherein the amine is selected from the group consisting of primary amines, secondary amines, tertiary amines, and mixtures thereof.

14. The method for preparing solutions having >20% by weight of $(M_w)$<120,000, $(M_n)$<30,000 emeraldine base form of polyaniline as described in claim 13, wherein the amine is selected from the group consisting of 2-methylaziridine, azetidine, pyrrolidine, piperidine, hexamethyleneimine, heptamethyleneimine, 3-pyrroline, 3-pyrrolidinol, (R)-(−)-pyrrolidine-2-methanol, (S)-(+)-pyrrolidine-2-methanol, 4-ethyl-2-methyl-(3-methylbutyl) oxazolidine, (S)-(+)-(anilinomethyl)pyrrolidine, 1,3,3-trimethyl-6-azabicyclo[3,2,1]octane, (S)-(+)-2 (methoxymethyl) pyrrolidine, indoline, thiomorpholine, decahydroquinoline, 2,6-dimethylmorpholine, diethylamine, dicyclohexylamine, dipropylamine, dibutylamine, N-methylhexylamine, 1-aza-15-crown-5, 1,2,3,6-tetrahydropyridine, 1,4,5,6-tetrahydropyrimidine, 1,4-dioxa-8-azaspiro[4.5]-decane, 3,3-dimethylpiperidine, morpholine, and 3,5-dimethylpiperidine, cyclopropylamine, n-butylamine, cyclobutylamine, cyclohexylamine, amylamine, t-amylamine, 2-amino-1-methoxypropane, 4-aminomorpholine, (±)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperdine, 4-(2-aminoethyl)morpholine, N-methylpyrrolidine, N-methylpiperidine, tripropylamine, 4-ethylmorpholine, 1,3,5-triethylhexahydro-s-triazine, 1,8-diazabicyclo[5,4,0]undec-7-ene, N,N-dimethylbenzylamine, N-ethylpiperidine, 1,4-dimethylpiperazine triethylamine, and mixtures thereof.

15. A method for preparing solutions having >20% by weight of $(M_w)$<120,000, $(M_n)$<30,000 emeraldine base form of polyaniline, which comprises the step of dissolving a chosen amount of polyaniline having $(M_w)$<120,000, $(M_n)$<30,000 in a bifunctional solvent therefor having both an amide group and an amine group, forming thereby a solution which is stable over a chosen time period, wherein the bifunctional solvent is selected from the group consisting of 1-(3-aminopropyl)-2-(pyrrolidinone), N,N-diethylnipecotamide, and mixtures thereof.

16. A solution having between 15% and 40% by weight of $(M_w)$≧120,000, $(M_n)$≧30,000 emeraldine base form of polyaniline which comprises a solvent selected from the group consisting of N-methyl-2-pyrrolidinone, N-ethyl-2-pyrrolidinone, 1-cyclohexyl-2-pyrrolidinone, 1-methyl-2-piperidone, N-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 1-acetylpiperazine, 4-acetylmorpholine, 1-acetyl-3-methylpiperidine, N,N-dimethylpropionamide, N,N,N',N'-tetramethyurea, N,N-dimethylacetamide, dimethylsulfoxide, tetrametylene sulfoxide, hexamethylphosphoramide, δ-valerolactam, N,N-2-trimethylpropionamide, and mixtures thereof; a chosen weight of polyaniline having $(M_w)$≧120,000 and $(M_n)$≧30,000; and a mixture of a primary amine and a secondary amine, wherein the molar ratio of the primary amine and secondary amine to polyaniline tetramer repeat unit is between 0.1 and 5.0.

17. The solution having between 15% and 40% by weight of $(M_w)$≧120,000, $(M_n)$≧30,000 emeraldine base form of polyaniline as described in claim 16, wherein the secondary amine is selected from the group consisting of wherein the secondary amine is selected from the group consisting of: 2-methylaziridine, azetidine, pyrrolidine, piperidine, hexamethyleneimine, heptamethyleneimine, 3-pyrroline, 3-pyrrolidinol, (R)-(−)-pyrrolidine-2-methanol, (S)-(+)-pyrrolidine-2-methanol, 4-ethyl-2-methyl-(3-methylbutyl) oxazolidine, (S)-(+)-(anilinomethyl)pyrrolidine, 1,3,3-trimethyl-6-azabicyclo[3,2,1]octane, (S)-(+)-2 (methoxymethyl) pyrrolidine, indoline, thiomorpholine, decahydroquinoline, 2,6-dimethylmorpholine, diethylamine, dicyclohexylamine, dipropylamine, dibutylamine, N-methylhexylamine, 1-aza-15-crown-5, 1,2,3,6-tetrahydropyridine, 1,4,5,6-tetrahydropyrimidine, 1,4-dioxa-8-azaspiro[4.5]-decane, 3,3-dimethylpiperidine, morpholine, and 3,5-dimethylpiperidine, and mixtures thereof.

18. The method for preparing solutions having between 15% and 40% by weight of $(M_w)$≧120,000, $(M_n)$≧30,000 emeraldine base form of polyaniline as described in claim 16, wherein the primary amine is selected from the group consisting of: cyclopropylamine, n-butylamine, cyclobutylamine, cyclohexylamine, amylamine, t-amylamine, 2-amino-1-methoxypropane, 4-aminomorpholine, (±)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperdine, 4-(2-aminoethyl)morpholine, and mixtures thereof.

19. A solution having between 15% and 40% by weight of $(M_w)$≧120,000, $(M_n)$≧30,000 emeraldine base form of polyaniline which comprises: a solvent selected from the group consisting of N-methyl-2-pyrrolidinone, N-ethyl-2-pyrrolidinone, 1-cyclohexyl-2-pyrrolidinone, 1-methyl-2-piperidone, N-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 1-acetylpiperazine, 4-acetylmorpholine, 1-acetyl-3-methylpiperidine, N,N-dimethylpropionamide, N,N,N',N'-tetramethyurea, N,N-dimethylacetamide, dimethylsulfoxide, tetrametylene sulfoxide, hexamethylphosphoramide, δ-valerolactam, N,N-2-trimethylpropionamide, and mixtures thereof; a chosen weight of polyaniline having $(M_w)$≧120,000 and $(M_n)$≧30, 000; and a primary amine, wherein the molar ratio of the primary amine to polyaniline tetramer repeat unit is between 0.1 and 5.0.

20. The solution having 15%–40% by weight of $(M_w) \geqq 120{,}000$, $(M_n) \geqq 30{,}000$ emeraldine base form of polyaniline as described in claim 19, wherein the primary amine is selected from the group consisting of wherein the primary amine is selected from the group consisting of: cyclopropylamine, n-butylamine, cyclobutylamine, cyclohexylamine, amylamine, t-amylamine, 2-amino-1-methoxypropane, 4-aminomorpholine, (±)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperidine, 4-(2-aminoethyl)morpholine, and mixtures thereof.

21. A solution having >20% by weight of $(M_n)$<120,000, $(M_n)$<30,000 emeraldine base form of polyaniline which comprises a solvent selected from the group consisting of N-methyl-2-pyrrolidinone, N-ethyl-2-pyrrolidinone, 1-cyclohexyl-2-pyrrolidinone, 1-methyl-2-piperidone, N-methylcaprolactam, 1,5-dimethyl-2-pyrrolidinone, 2-pyrrolidinone, 1,3-dimethyl-2-imidazolidinone, 1,3-dimethyl-3,4,5,6-tetrahydro-2(1H)-pyrimidinone, 1-methyl-2-pyridone, 1-acetylpyrrolidine, 1-acetylpiperdine, 1-acetylpiperazine, 4-acetylmorpholine, 1-acetyl-3-methylpiperidine, N,N-dimethylpropionamide, N,N,N',N'-tetramethyurea, N,N-dimethylacetamide, dimethylsulfoxide, tetrametylene sulfoxide, hexamethylphosphoramide, δ-valerolactam, N,N-2-trimethylpropionamide, and mixtures thereof; a chosen of polyaniline having $(M_w)$<120,000 and $(M_n)$<30,000; and an amine, wherein the molar ratio of the amine to polyaniline tetramer repeat unit is between 0.1 and 5.0.

22. The solution having >20% by weight of $(M_w)$<120,000, $(M_n)$<30,000 emeraldine base form of polyaniline as described in claim 21, wherein the amine is selected from the group consisting of primary amines, secondary amines, tertiary amines, and mixtures thereof.

23. The solution having >20% by weight of $(M_w)$<120,000, $(M_n)$<30,000 emeraldine base form of polyaniline as described in claim 22, wherein the amine is selected from the group consisting of 2-methylaziridine, azetidine, pyrrolidine, piperidine, hexamethyleneimine, heptamethyleneimine, 3-pyrroline, 3-pyrrolidinol, (R)-(−)-pyrrolidone-2-methanol, (S)-(+)-pyrrolidine-2-methanol, 4-ethyl-2-methyl-(3-methylbutyl)oxazolidine, (S)-(+)-(anilinomethyl)pyrrolidine, 1,3,3-trimethyl-6-azabicyclo[3,2,1]octane, (S)-(+)-2 (methoxymethyl) pyrrolidine, indoline, thiomorpholine, decahydroquinoline, 2,6-dimethylmorpholine, diethylamine, dicyclohexylamine, dipropylamine, dibutylamine, N-methylhexylamine, 1-aza-15-crown-5, 1,2,3,6-tetrahydropyridine, 1,4,5,6-tetrahydropyrimidine, 1,4-dioxa-8-azaspiro[4.5]-decane, 3,3-dimethylpiperidine, morpholine, and 3,5-dimethylpiperidine, cyclopropylamine, n-butylamine, cyclobutylamine, cyclohexylamine, amylamine, t-amylamine, 2-amino-1-methoxypropane, 4-aminomorpholine, (±)-exo-2-aminonorbornane, 1,2-diaminopropane, 1,2-diaminocyclohexane, cyclooctylamine, 1,4-diaminobutane, 1-aminopiperidine, 1-aminohomopiperidine, tetrahydrofurfurylamine, furfurylamine, 1,2-diamino-2-methylpropane, 1-methyl-4-(methylamino)piperidine, 4-(2-aminoethyl)morpholine, N-methylpyrrolidine, N-methylpiperidine, tripropylamine, 4-ethylmorpholine, 1,3,5-triethylhexahydro-s-triazine, 1,8-diazabicyclo[5,4,0]undec-7-ene, 1,4-dimethylpiperazine triethylamine, N,N-dimethylbenzylamine, N-ethylpiperidine, and mixtures thereof.

24. A solution having >20% by weight of $(M_w)$<120,000, $(M_n)$<30,000 emeraldine base form of polyaniline, which comprises a solution of a chosen amount of polyaniline having $(M_w)$<120,000 and $(M_n)$<30,000 in a bifunctional solvent therefor having both an amide group and an amine group selected from the group consisting of 1-(3-aminopropyl)-2-pyrrolidinone, N,N-diethylnipecotamide, and mixtures thereof.

* * * * *